(12) United States Patent
Faucher et al.

(10) Patent No.: US 7,563,318 B1
(45) Date of Patent: Jul. 21, 2009

(54) METHOD OF MAKING NANOSCALE PARTICLES OF AZO PIGMENTS IN A MICROREACTOR OR MICROMIXER

(75) Inventors: Santiago Faucher, Oakville (CA); Rina Carlini, Oakville (CA); Emily L. Moore, Mississauga (CA); Christine M. Thompson, Etobicoke (CA); Sandra J. Gardner, Oakville (CA); Paul J. Gerroir, Oakville (CA); C. Geoffrey Allen, Waterdown (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/166,949

(22) Filed: Jul. 2, 2008

(51) Int. Cl.
*C09B 63/00* (2006.01)
*C09B 67/20* (2006.01)
*C09B 41/00* (2006.01)

(52) U.S. Cl. .................. 106/496; 106/402; 534/579

(58) Field of Classification Search .............. 106/402, 106/496; 534/579
See application file for complete search history.

(56) References Cited

U.S. PATENT DOCUMENTS

| | | | |
|---|---|---|---|
| 4,830,671 A | 5/1989 | Frihart et al. | |
| 4,889,560 A | 12/1989 | Jaeger et al. | |
| 4,889,761 A | 12/1989 | Titterington et al. | |
| 5,194,638 A | 3/1993 | Frihart et al. | |
| 5,278,020 A | 1/1994 | Grushkin et al. | |
| 5,290,654 A | 3/1994 | Sacripante et al. | |
| 5,308,734 A | 5/1994 | Sacripante et al. | |
| 5,344,738 A | 9/1994 | Kmiecik-Lawrynowicz et al. | |
| 5,346,797 A | 9/1994 | Kmiecik-Lawrynowicz et al. | |
| 5,364,729 A | 11/1994 | Kmiecik-Lawrynowicz et al. | |
| 5,370,963 A | 12/1994 | Patel et al. | |
| 5,372,852 A | 12/1994 | Titterington et al. | |
| 5,403,693 A | 4/1995 | Patel et al. | |
| 5,418,108 A | 5/1995 | Kmiecik-Lawrynowicz et al. | |
| 5,597,856 A | 1/1997 | Yu et al. | |
| 5,679,138 A | 10/1997 | Bishop et al. | |
| 6,174,937 B1 | 1/2001 | Banning et al. | |
| 6,399,713 B1 | 6/2002 | MacQueen et al. | |
| 6,437,104 B1 | 8/2002 | Nickel et al. | |
| 6,469,147 B2 | 10/2002 | Nickel et al. | |
| 6,492,458 B1 | 12/2002 | Pavlin et al. | |
| 6,537,364 B2 | 3/2003 | Dietz et al. | |
| 6,723,138 B2 | 4/2004 | Nickel et al. | |
| 6,837,918 B2 | 1/2005 | Pozarnsky et al. | |
| 7,160,380 B2 | 1/2007 | Maeta et al. | |
| 7,262,284 B2 | 8/2007 | Schupp et al. | |
| 7,465,348 B1 * | 12/2008 | Carlini et al. ............... | 106/496 |
| 7,465,349 B1 * | 12/2008 | Carlini et al. ............... | 106/496 |
| 7,473,310 B2 * | 1/2009 | Carlini et al. ............... | 106/496 |
| 2001/0029294 A1 | 10/2001 | Nickel et al. | |
| 2002/0058794 A1 | 5/2002 | Nickel et al. | |
| 2003/0065084 A1 | 4/2003 | MacQueen et al. | |
| 2003/0158410 A1 | 8/2003 | Nickel et al. | |
| 2003/0164118 A1 | 9/2003 | Nickel et al. | |
| 2003/0199608 A1 | 10/2003 | Kamigaki et al. | |
| 2005/0109240 A1 | 5/2005 | Maeta et al. | |
| 2006/0063873 A1 | 3/2006 | Lin et al. | |
| 2006/0194897 A1 | 8/2006 | Kawabe et al. | |
| 2007/0012221 A1 | 1/2007 | Maeta et al. | |
| 2007/0120921 A1 | 5/2007 | Carlini et al. | |
| 2007/0120924 A1 | 5/2007 | Odell et al. | |
| 2007/0213516 A1 | 9/2007 | Hoellein et al. | |
| 2007/0289500 A1 | 12/2007 | Maeta et al. | |
| 2008/0078305 A1 | 4/2008 | Nagasawa et al. | |

FOREIGN PATENT DOCUMENTS

| | | |
|---|---|---|
| GB | 2 238 792 | 6/1991 |
| JP | 2005238342 | 9/2005 |
| JP | 2007023168 | 2/2007 |
| JP | 2007023169 | 2/2007 |
| WO | 2004/026967 | 4/2004 |
| WO | 2006/005521 | 1/2006 |
| WO | 2006/005536 | 1/2006 |
| WO | 2006/011467 | 2/2006 |
| WO | 2006/024103 | 3/2006 |
| WO | 2006/132443 | 12/2006 |

OTHER PUBLICATIONS

Hideki Maeta et al., "New Synthetic Method of Organic Pigment Nano Particle by Micro Reactor System," http://aiche.confex.com/aiche/s06/preliminaryprogram/abstract_40072.htm (date unknown).

K. Balakrishnan et al., "Effect of Side-Chain Substituents on Self-Assembly of Perylene Diimide Molecules: Morphology Control," *J. Am. Chem. Soc.*, vol. 128, p. 7390-98 (2006).

Kazuyuki Hayashi et al., "Uniformed nano -downsizing of organic pigments through core-shell structuring," Journal of Materials Chemistry , 17(6), 527-530 (2007).

(Continued)

*Primary Examiner*—Anthony J Green
(74) *Attorney, Agent, or Firm*—Oliff & Berridge PLC

(57) ABSTRACT

A process for preparing nanoscale azo pigment particles includes providing an organic pigment precursor that contains at least one functional moiety, providing a sterically bulky stabilizer compound that contains at least one functional group, and carrying out a chemical reaction to form a pigment composition in a microreactor or micromixer, whereby the functional moiety found on the pigment precursor is incorporated within the pigment and non-covalently associated with the functional group of the stabilizer, so as to allow the formation of nanoscale-sized pigment particles and the production of such in a microreactor under laminar or turbulent flow conditions without clogging.

26 Claims, 2 Drawing Sheets

OTHER PUBLICATIONS

Kento Ujiiye-Ishii et al., "Mass-Production of Pigment Nanocrystals by the Reprecipitation Method and their Encapsulation," *Molecular Crystals and Liquid Crystals*, v. 445, p. 177 (2006).

H. Kim et al., "Pigments With Improved Properties—Microreaction Technology as a New Approach for Synthesis of Pigments," Macromol. Symp. vol. 187, pp. 631-640 (2002).

H. Pennemann et al., "Improvement of Dye Properties of the Azo Pigment Yellow 12 Using a Micromixer-Based Process," Org. Process Research & Development, vol. 9, pp. 188-192 (2005).

U.S. Appl. No. 11/759,906, filed Jun. 7, 2007, to Maria Birau et al.
U.S. Appl. No. 11/759,913, filed Jun. 7, 2007, to Rina Carlini et al.
U.S. Appl. No. 11/933,471, filed Nov. 1, 2007, to Rina Carlini et al.
U.S. Appl. No. 12/044,613, filed Mar. 7, 2008, to Rina Carlini.

* cited by examiner

METHOD OF MAKING NANOSCALE PARTICLES OF AZO PIGMENTS IN A MICROREACTOR OR MICROMIXER

TECHNICAL FIELD

This disclosure is generally directed to methods for producing nanoscale pigment particle compositions. More specifically, this disclosure is directed to methods of making organic nanoscale azo pigments in a microreactor or micromixer. Such particles are useful, for example, as nanoscopic colorants for such compositions as inks, toners and the like.

CROSS-REFERENCE TO RELATED APPLICATIONS

Disclosed in commonly assigned U.S. patent application Ser. No. 11/759,913 to Rina Carlini et al. filed Jun. 7, 2007, is a nanoscale pigment particle composition, comprising: an organic monoazo laked pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized pigment particles. Also disclosed is a process for preparing nanoscale-sized monoazo laked pigment particles, comprising: preparing a first reaction mixture comprising: (a) a diazonium salt including at least one functional moiety as a first precursor to the laked pigment and (b) a liquid medium containing diazotizing agents generated in situ from nitrous acid derivatives; and preparing a second reaction mixture comprising: (a) a coupling agent including at least one functional moiety as a second precursor to the laked pigment and (b) a sterically bulky stabilizer compound having one or more functional groups that associate non-covalently with the coupling agent; and (c) a liquid medium combining the first reaction mixture into the second reaction mixture to form a third solution and effecting a direct coupling reaction which forms a monoazo laked pigment composition wherein the functional moiety associates non-covalently with the functional group and having nanoscale particle size. Further disclosed is a process for preparing nanoscale monoazo laked pigment particles, comprising: providing a monoazo precursor dye to the monoazo laked pigment that includes at least one functional moiety; subjecting the monoazo precursor dye to an ion exchange reaction with a cation salt in the presence of a sterically bulky stabilizer compound having one or more functional groups; and precipitating the monoazo laked pigment as nanoscale particles, wherein the functional moiety of the pigment associates non-covalently with the functional group of the stabilizer and having nanoscale particle size.

Disclosed in commonly assigned U.S. patent application Ser. No. 11/933,471 to Rina Carlini et al. filed Nov. 1, 2007, is a process for preparing nanoscale particles of monoazo laked pigments, comprising: providing an organic pigment precursor to a monoazo laked pigment that contains at least one functional moiety, providing a sterically bulky stabilizer compound that contains at least one functional group, and carrying out a chemical reaction to form a monoazo laked pigment composition, whereby the functional moiety found on the pigment precursor is incorporated within the monoazo laked pigment and non-covalently associated with the functional group of the stabilizer, so as to allow the formation of nanoscale-sized pigment particles. In one embodiment, the process comprises preparing a first reaction mixture comprising: (a) a diazonium salt including at least one functional moiety as a first precursor to the laked pigment and (b) a liquid medium containing diazotizing agents; preparing a second reaction mixture comprising: (a) a coupling agent including at least one functional moiety as a second precursor to the laked pigment and (b) a sterically bulky stabilizer compound having one or more functional groups that associate non-covalently with the coupling agent; and (c) a liquid medium; combining the first reaction mixture into the second reaction mixture to form a third solution; and effecting a direct coupling reaction which forms a monoazo laked pigment composition having nanoscale particle size, and wherein a functional moiety of the pigment associates non-covalently with the functional group of the stabilizer. In another embodiment the process comprises providing a monoazo precursor dye to the monoazo laked pigment that includes at least one functional moiety; subjecting the monoazo precursor dye to an ion exchange reaction with a cation in the presence of a sterically bulky stabilizer compound having one or more functional groups; and precipitating the monoazo laked pigment having nanoscale particle size, wherein the functional moiety of the pigment associates non-covalently with the functional group of the stabilizers.

Disclosed in commonly assigned U.S. patent application Ser. No. 11/759,906 to Maria Birau et al. filed Jun. 7, 2007, is a nanoscale pigment particle composition, comprising: a quinacridone pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized particles. Also disclosed is a process for preparing nanoscale quinacridone pigment particles, comprising: preparing a first solution comprising: (a) a crude quinacridone pigment including at least one functional moiety and (b) a liquid medium; preparing a second solution comprising: (a) a sterically bulky stabilizer compound having one or more functional groups that associate non-covalently with the functional moiety, and (b) a liquid medium; combining the first reaction mixture into the second reaction mixture to form a third solution and effecting a direct coupling reaction which forms a quinacridone pigment composition wherein the functional moiety associates non-covalently with the functional group and having nanoscale particle size.

Disclosed in commonly assigned U.S. patent application Ser. No. 12/044,613 to Rina Carlini filed Mar. 7, 2008, is a nanoscale pigment particle composition, comprising: a benzimidazolone pigment, and a sterically bulky stabilizer compound associated non-covalently with the benzimidazolone pigment; wherein the presence of the associated stabilizer limits an extent of particle growth and aggregation, to afford nanoscale-sized pigment particles. Also disclosed is a process for preparing nanoscale particles of benzimidazolone pigments, comprising: providing one or more organic pigment precursor to a benzimidazolone pigment, providing a solution or suspension of a sterically bulky stabilizer compound that associates non-covalently with the benzimidazolone moiety on one of the pigment precursors, and carrying out a chemical coupling reaction to form a benzimidazolone pigment composition, whereby the pigment precursors are incorporated with the benzimidazolone pigment and one or more functional moieties on the benzimidazolone pigment is non-covalently associated with the steric stabilizer, so as to limit the extent of particle growth and aggregation and result in nanoscale-sized pigment particles.

The entire disclosure of the above-mentioned applications are totally incorporated herein by reference.

BACKGROUND

A printing ink is generally formulated according to strict performance requirements demanded by the intended market application and required properties. Whether formulated for office printing or for production printing, a particular ink is expected to produce images that are robust and durable under stress conditions. In a typical design of a piezoelectric ink jet printing device, the image is applied by jetting appropriately colored inks during four to six rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Pigments are a class of colorants useful in a variety of applications such as, for example, paints, plastics and inks, including inkjet printing inks. Dyes have typically been the colorants of choice for inkjet printing inks because they are readily soluble colorants which enable jetting of the ink. Dyes have also offered superior and brilliant color quality with an expansive color gamut for inks, when compared to conventional pigments. However, since dyes are molecularly dissolved in the ink vehicle, they are often susceptible to unwanted interactions that lead to poor ink performance, for example photooxidation from light (will lead to poor lightfastness), dye diffusion from the ink into paper or other substrates (will lead to poor image quality and showthrough), and the ability for the dye to leach into another solvent that makes contact with the image (will lead to poor water-/solvent-fastness). In certain situations, pigments are the better alternative as colorants for inkjet printing inks since they are insoluble and cannot be molecularly dissolved within the ink matrix, and therefore do not experience colorant diffusion. Pigments can also be significantly less expensive than dyes, and so are attractive colorants for use in all printing inks.

Key challenges with using pigments for inkjet inks are their large particle sizes and wide particle size distribution, the combination of which can pose critical problems with reliable jetting of the ink (i.e. inkjet nozzles are easily blocked). Pigments are rarely obtained in the form of single crystal particles, but rather as large aggregates of crystals and with wide distribution of aggregate sizes. The color characteristics of the pigment aggregate can vary widely depending on the aggregate size and crystal morphology. Thus, an ideal colorant that is widely applicable in, for example, inks and toners, is one that possesses the best properties of both dyes and pigments, namely: 1) superior coloristic properties (large color gamut, brilliance, hues, vivid color); 2) color stability and durability (thermal, light, chemical and air-stable colorants); 3) minimal or no colorant migration; 4) processable colorants (easy to disperse and stabilize in a matrix); and 5) inexpensive material cost. Thus, there is a need addressed by embodiments of the present invention, for smaller nano-sized pigment particles that minimize or avoid the problems associated with conventional larger-sized pigment particles. There further remains a need for processes for making and using such improved nano-sized pigment particles as colorant materials. The present nanosized pigment particles are useful in, for example, paints, coatings and inks (e.g., inkjet printing inks) and other compositions where pigments can be used such as plastics, optoelectronic imaging components, photographic components, and cosmetics among others.

Microreactors have been defined as "Microsystems fabricated, at least partially, by methods of microtechnology and precision engineering. Fluid channels range from 1 um (nanoreactors) to 1 mm (minireactors)." See *Microreactors*, Ehrfeld, Hessel & Lowe 2000, and W. Ehrfeld et al., "Microreactors—New Technology for Modern Chemistry, $1^{st}$ Edition, Wiley-VCH, Weinheim, 5-11 (2001), the entire disclosures of which are incorporated herein by reference. Typical microreactors consist of miniaturized channels, often imbedded in a flat surface referred to as the "chip." These flat surfaces can be glass plates or plates of metals such as stainless steel or Hastelloy. Microreactors have proven to be highly valuable tools in organic chemistry due to their wide flexibility of operating conditions with efficient heat transfer, optimized mixing, and high reaction control. Advantages of a microreactor over more conventional batch reactions include: faster efficient mixing, selectivity enhanced-side products and secondary reactions reduced, higher yields and purities, extreme reaction conditions, time and cost savings, and increased surface area to volume ratio that results in good mass and heat transfer. Microreactors are particularly useful for rapid optimization, screening different reaction conditions, catalysts, ligands, bases, and solvents; mechanistic studies; cost effective industrial scale up; and rapid screening for new pharmaceuticals. Although microreactors have distinct advantages over conventional batch reaction techniques, microreactor chemistry also has its own shortcomings. For example, microreactors generally do not tolerate particulate matter well, often clogging.

Few examples exist where micro reaction technology has been applied to the production of suspensions containing solid materials. This is on account of the high potential for blockage of the micro channels that form these micro devices (less than 1 mm). Some example do exist where custom fabricated microreactors can be applied to the synthesis of solid materials (pigments). See, for example, U.S. Pat. Nos. 6,437,104 B1, 6,469,147 B2, and 6,723,138 B2. Custom made micro fluidic devices have also been applied for the production of fine pigments. See, for example, U.S. Patent Publications Nos. 2005/0109240 A1 and 2008/0078305 A1. These references have generally avoided the clogging of microreactor channels by either ensuring turbulent flow conditions or by designing simplified microfluidic devices with a limited number of passes (once through) and therefore a limited number of bends. Neither of these approaches is however convenient for the general production of materials in microreactors. Turbulent flow conditions require that fluids be pumped through the microreactor at high flowrates and this leads to high pressure drops through the system that increase the required pump delivery pressures. Secondly high flowrates may be detrimental to the synthesis of the desired material as the material is degraded by flow induced shear during the synthesis. Simplified microfluidic devices with a single straight through pass are also not convenient as such devices offer limited mixing efficiencies and therefore low yields. Furthermore the productivity of such devices is restricted by the limited residence times they offer. Low flowrates in the range of μL/min are generally used to make materials with these devices. Such flowrates are not practical for the large scale production of solid materials. Microreactors with flow rates that are 3 to 6 orders of magnitude higher are more practical (mL/min to L/min). A more desirable microreactor process for solid material synthesis, and in our specific case pigment synthesis, would be one that offers a wide range of possible residence times through the use of multiple bends and passes internal to the microreactor and under flow conditions that are laminar without clogging. No such process has been reported. We report here a microreactor process that produces solid pigment particles under laminar flow conditions and at high flowrates by limiting the growth of the formed pigment particles to the nanometer range and thus preventing clogging. This process leads to a production rate of the desired nanopigment and permits good control of the reaction conditions as compared to the conventional batch process.

The following documents provide background information:

U.S. Patent Application Publication No. 2008/0078305 A1 describes two or more solutions comprising an organic pigment solution in which an organic pigment is dissolved in a good solvent, and a poor solvent compatible with the good solvent, or a solution of the poor solvent are allowed to flow through a microchannel in a non-laminar state; and organic pigment fine particles are deposited from the organic pigment solution in a course of flowing through the microchannel by changing the solubility of the organic pigment solution with the poor solvent or the solution of the poor solvent. As a result, nanometer-scale monodisperse organic pigment fine particles can be produced in a stable manner.

U.S. Patent Application Publication No. 2006/0194897 A1 describes a pigment dispersion that can be suitably used as a coloring material for inks, especially inks for ink-jet recording, comprising a colored pigment in primary particles dispersed stably in a liquid medium, and a process for producing the pigment dispersion. A pigment dispersion comprising a colored pigment that is substantially of a primary particle maintaining type and is dispersed in a liquid medium, a process for producing the pigment dispersion, and an ink and recorded image using the pigment dispersion.

U.S. Patent Application Publication No. 2003/0164118 A1 describes a process for conditioning organic pigments by introducing a liquid prepigment suspension into a miniaturized continuous reactor and thermally treating therein.

U.S. Patent Application Publication No. 2003/0158410 A1 describes a process for preparing diketopyrrolopyrrole pigments comprises conducting the elementary steps of pigment synthesis (reaction and hydrolysis) in a miniaturized continuous reactor.

U.S. Patent Application Publication No. 2007/0289500 A1 describes a method of producing a dispersion of a pigment, comprising: bringing a solution in which an organic pigment is dissolved, and an aqueous medium, into contact with each other in a channel having an equivalent diameter of 1 mm or less, thereby making the pigment into a fine particle thereof, wherein at least one of the solution and the aqueous medium comprises at least one anionic dispersing agent.

U.S. Patent Application Publication No. 2007/0213516 A1 describes a process for producing high-purity azo colorants is characterized in that (a) at least the azo coupling is carried out in a micro-reactor, (b) the azo-dye produced in the micro-reactor is brought into intimate contact with an organic solvent from the group of the $C_3$-$C_6$ alcohols, the $C_4$-$C_{10}$ ether alcohols and the halogenated aromatics at a temperature from 0 to 60° C., and (c) the azo dye produced in the micro-reactor is subjected to membrane purification in an aqueous or solvent-containing suspension.

WO 2006/132443 A1 describes a method of producing organic pigment fine particles, wherein when producing organic pigment fine particles by allowing two or more solutions at least one of which is an organic pigment solution in which an organic pigment is dissolved to flow through a microchannel, the organic pigment solution flows through the microchannel in a non-laminar state. Accordingly, the contact area of solutions per unit time can be increased and the length of diffusion mixing can be shortened, and thus instantaneous mixing of solutions becomes possible. As a result, nanometer-scale monodisperse organic pigment fine particles can be produced in a stable manner.

U.S. Pat. No. 7,160,380 describes a method of producing a fine particle of an organic pigment, containing the steps of: flowing a solution of an organic pigment dissolved in an alkaline or acidic aqueous medium, through a channel which provides a laminar flow; and changing a pH of the solution in the course of the laminar flow.

U.S. Pat. No. 7,262,284 describes a method for the production of a diazo pigment, or a mixture of diazo pigments, according to formula (1) of the specification by azo coupling, wherein the azo coupling product is subjected to a finish in an organic solvent or in an aqueous organic solvent with a neutral or alkaline pH.

U.S. Patent Application Publication No. 2002/0058794 A1 describes a process for preparing disazo condensation pigments by diazotization of an aromatic amine, azo coupling with a coupling component to form an azocarboxylic acid or azodicarboxylic acid, formation of an azocarbonyl chloride or azodicarbonyl dichloride and condensation of the azocarbonyl chloride with an aromatic diamine or of the azodicarbonyl dichloride with an aromatic amine comprises effecting the acyl chloride formation and/or the condensation and optionally the diazotization and optionally the azo coupling in a microreactor.

U.S. Patent Application Publication No. 2001/0029294 A1 describes azo colorants that are prepared by conducting the diazotization of aromatic or heteroaromatic amines or the azo coupling reaction or the diazotization and the azo coupling reaction in a microreactor.

Hideki Maeta et al., "New Synthetic Method of Organic Pigment Nano Particle by Micro Reactor System," in an abstract available on the internet, describes a new synthetic method of an organic pigment nanoparticle was realized by micro reactor. A flowing solution of an organic pigment, which dissolved in an alkaline aqueous organic solvent, mixed with a precipitation medium in a micro channel. Two types of micro reactor can be applied efficiently on this build-up procedure without blockage of the channel. The clear dispersion was extremely stable and had narrow size distribution, which were the features, difficult to realize by the conventional pulverizing method (breakdown procedure). These results proved the effectiveness of this process on micro reactor system.

U.S. Patent Application Publication No. 2005/0109240 describes a method of producing a fine particle of an organic pigment, containing the steps of: flowing a solution of an organic pigment dissolved in an alkaline or acidic aqueous medium, through a channel which provides a laminar flow; and changing a pH of the solution in the course of the laminar flow.

WO 2006/132443 A1 describes a method of producing organic pigment fine particles by allowing two or more solutions, at least one of which is an organic pigment solution in which an organic pigment is dissolved, to flow through a microchannel, the organic pigment solution flows through the microchannel in a non-laminar state. Accordingly, the contact area of solutions per unit time can be increased and the length of diffusion mixing can be shortened, and thus instantaneous mixing of solutions becomes possible. As a result, nanometer-scale monodisperse organic pigment fine particles can be produced in a stable manner.

K. Balakrishnan et al., "Effect of Side-Chain Substituents on Self-Assembly of Perylene Diimide Molecules: Morphology Control," *J. Am. Chem. Soc.*, vol. 128, p. 7390-98 (2006) describes the use of covalently-linked aliphatic side-chain substituents that were functionalized onto perylene diimide molecules so as to modulate the self-assembly of molecules and generate distinct nanoparticle morphologies (nano-belts to nano-spheres), which in turn impacted the electronic properties of the material. The side-chain substituents studied were linear dodecyl chain, and a long branched nonyldecyl chain, the latter substituent leading to the more compact, spherical nanoparticle.

U.S. Patent Application Publication No. 2003/0199608 discloses a functional material comprising fine coloring particles having an average primary particle diameter of 1 to 50 nm in a dried state, and having a BET specific surface area value of 30 to 500 $m^2/g$ and a light transmittance of not less than 80%. The functional material composed of fine coloring particles, exhibits not only an excellent transparency but also a high tinting strength and a clear hue.

U.S. Pat. No. 6,537,364 discloses a process for the fine division of pigments which comprises dissolving coarsely crystalline crude pigments in a solvent and precipitating them with a liquid precipitation medium by spraying the pigment solution and the precipitation medium through nozzles to a point of conjoint collision in a reactor chamber enclosed by a housing in a microjet reactor, a gas or an evaporating liquid being passed into the reactor chamber through an opening in the housing for the purpose of maintaining a gas atmosphere in the reactor chamber, and the resulting pigment suspension and the gas or the evaporated liquid being removed from the reactor through a further opening in the housing by means of overpressure on the gas entry side or underpressure on the product and gas exit side.

U.S. Pat. No. 5,679,138 discloses a process for making ink jet inks, comprising the steps of: (A) providing an organic pigment dispersion containing a pigment, a carrier for the pigment and a dispersant; (B) mixing the pigment dispersion with rigid milling media having an average particle size less than 100 μm; (C) introducing the mixture of step (B) into a high speed mill; (D) milling the mixture from step (C) until a pigment particle size distribution is obtained wherein 90% by weight of the pigment particles have a size less than 100 nanometers (nm); (E) separating the milling media from the mixture milled in step (D); and (F) diluting the mixture from step (E) to obtain an ink jet ink having a pigment concentration suitable for ink jet printers.

Japanese Patent Application Publications Nos. JP 2007023168 and JP 2007023169 discloses providing a pigment dispersion compound excellent in dispersibility and flowability used for the color filter which has high contrast and weatherability. The solution of the organic material, for example, the organic pigment, dissolved in a good solvent under the existence of alkali soluble binder (A) which has an acidic group, and a poor solvent which makes the phase change to the solvent are mixed. The pigment nanoparticles dispersed compound re-decentralized in the organic solvent containing the alkali soluble binder (B) which concentrates the organic pigment nanoparticles which formed the organic pigment as the particles of particle size less than 1 μm, and further has the acidic group.

Kazuyuki Hayashi et al., "Uniformed nano-downsizing of organic pigments through core-shell structuring," Journal of Materials Chemistry, 17(6), 527-530 (2007) discloses that mechanical dry milling of organic pigments in the presence of mono-dispersed silica nanoparticles gave core-shell hybrid pigments with uniform size and shape reflecting those of the inorganic particles, in striking contrast to conventional milling as a breakdown process, which results in limited size reduction and wide size distribution.

U.S. Patent Application Publication No. 2007/0012221 describes a method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

The appropriate components and process aspects of each of the foregoing may be selected for the present disclosure in embodiments thereof, and the entire disclosure of the above-mentioned references are totally incorporated herein by reference.

SUMMARY

The present disclosure addresses these and other needs, by providing methods for producing nanoscale pigment particle compositions. The disclosure provides a process for making nanoscale organic pigment particles such as, for example, azo type pigments like azo pigments and azo laked pigments, including monoazo, disazo, and the like, using a commercial microreactor or micromixer, and describes an operating window within which this process operates for the formation of such nanoparticles. Production rates with this process are approximately five times higher than those achieved in batch. Under laminar flow conditions this process allows the continuous production of nanopigments without clogging of the microreactor or micromixer. The process of nanoscale pigment production is not limited to the laminar flow regime but can also be practiced in the turbulent flow regime. In addition, the nanoscale organic azo pigments produced by using this microreactor or micromixer process operating provides particles with enhanced coloristic properties.

In an embodiment, the present disclosure provides a process for preparing nanoscale azo pigment particles, comprising: providing an organic pigment precursor that contains at least one functional moiety, providing a sterically bulky stabilizer compound that contains at least one functional group, and carrying out a chemical reaction to form a pigment composition in a microreactor or micromixer, whereby the functional moiety found on the pigment precursor is incorporated within the pigment and non-covalently associated with the functional group of the stabilizer, so as to allow the formation of nanoscale-sized pigment particles.

DETAILED DESCRIPTION OF EXEMPLARY EMBODIMENTS

Figure 1:
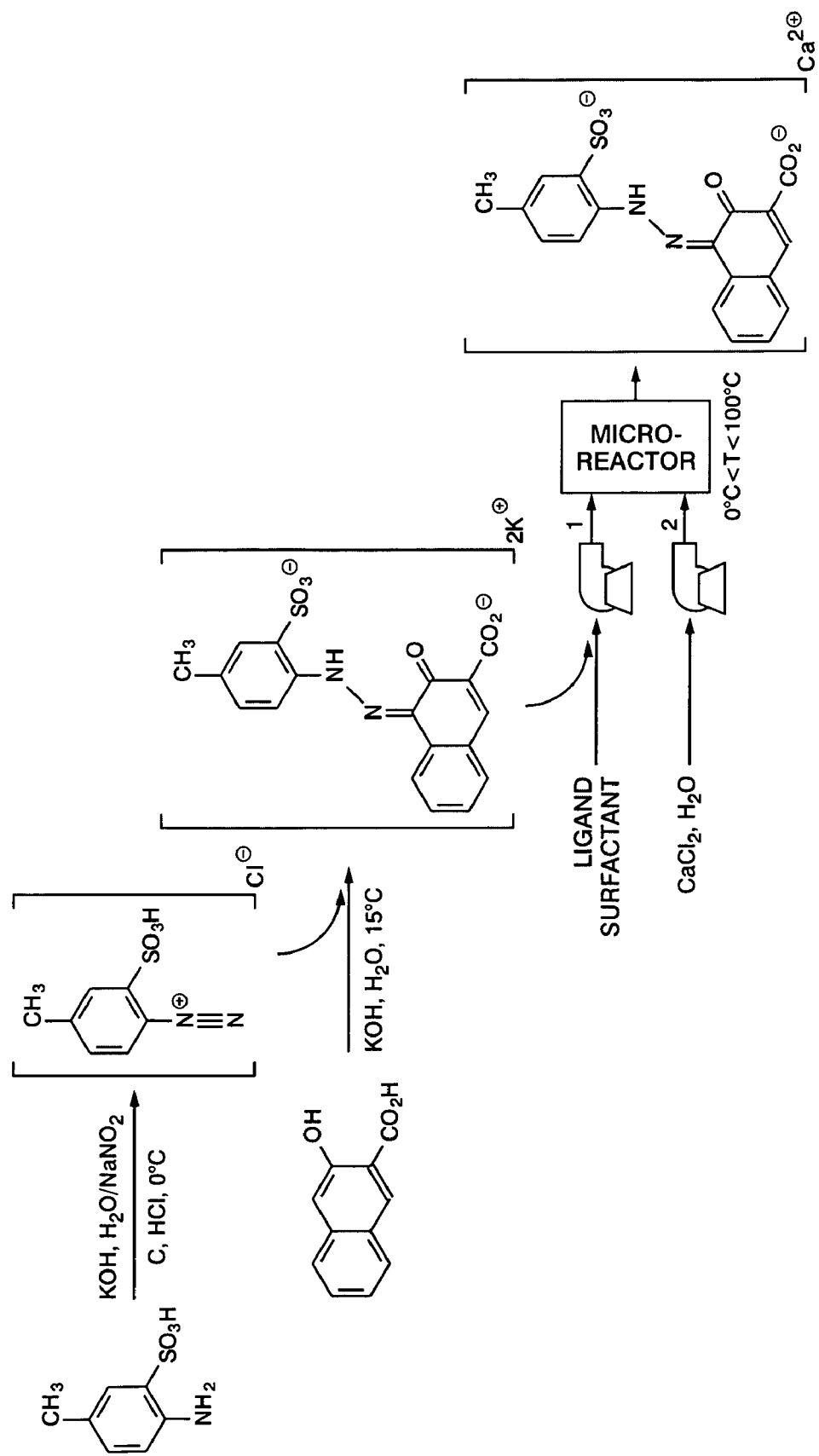
FIG. 1 shows an exemplary diagram of the process of the disclosure.

Embodiments of the present disclosure provide improved methods for producing nanoscale pigment particle compositions in a microreactor or micromixer. The nanoscale pigment particle compositions generally comprise an organic pigment, such as of the azo type, including at least one functional moiety that associates non-covalently with a functional group from a sterically bulky stabilizer compound. As used herein "azo type" refers to azo or azo laked pigments, where the azo group can be monoazo, disazo, or the like. The presence of the associated stabilizer limits the extent of particle growth and aggregation, to afford nanoscale particles. This approach of using steric stabilizers permits the controlled assembly and production of stabilized nanopigments in microreactors or micromixers without clogging under both laminar and turbulent flow conditions.

Organic monoazo "laked" pigments are the insoluble metal salt colorants of monoazo colorants which can include monoazo dyes or pigments, and in certain geographic regions these pigments have been referred to as either "toners" or "lakes." Other "laked" pigments are similarly metal salt forms of the underlying colorant. The process of ion complexation with a metal salt, or "laking" process, provides decreased solubility of the non-ionic monoazo pigment, which can enhance the migration resistance and thermal stability properties of a monoazo pigment, and thereby enable the applications of such pigments for robust performance, such as colorizing plastics and heat-stable paints for outdoor use. A general representation of both monoazo and monoazo-laked pigments is shown in the general formula 1, which such pigments are structurally comprised of a diazo group (denoted $G_d$) and a nucleophilic coupling group (denoted as $G_c$) that are linked together with one azo (N=N) functional group. In the case of laked monoazo pigments, which are ionic salt compounds, the cation $M^{n+}$ is shown as being coordinated to one or more ionic functional moieties on the pigments and is typically a metal salt. Either or both of the groups $G_d$ and $G_c$ can contain one or more ionic functional moieties (denoted as FM), such as sulfonate or carboxylate anions or the like.

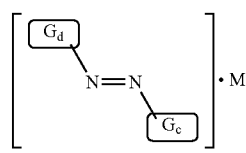

Formula (1)

As an example, the organic monoazo laked pigment PR 57:1 ("PR" refers to Pigment Red) has two functional moieties of two different types, a sulfonate anion group ($SO_3^-$) and carboxylate anion group ($CO_2^-$) and a metal counter-cation $M^{n+}$ that is chosen from Group 2 alkaline earth metals such as $Ca^{2+}$. Other monoazo laked pigment compositions also exist that have a counter-cation chosen from either Group 2 alkaline earth metals (Be, Mg, Ca, Sr, Ba,), Group 3 metals (B, Al, Ga), Group 1 alkali metals(Li, Na, K, Cs), the transition metals such as Cr, Mn, Fe, Ni, Cu, Zn, or others non-metallic cations such as ammonium ($NR_4^+$), phosphonium ($PR_4^+$) wherein R-group can be H or alkyl group having from about 1 to about 12 carbons. Further, the azo group in the compounds can generally assume one or more tautomeric forms, such as the "azo" tautomer form which has the (N=N) linkage, and the "hydrazone" tautomer form which has the (C=N—NH—) linkage that is stabilized by an intramolecular hydrogen bond, where the hydrazone tautomer is known to be the preferred structural form for PR 57:1.

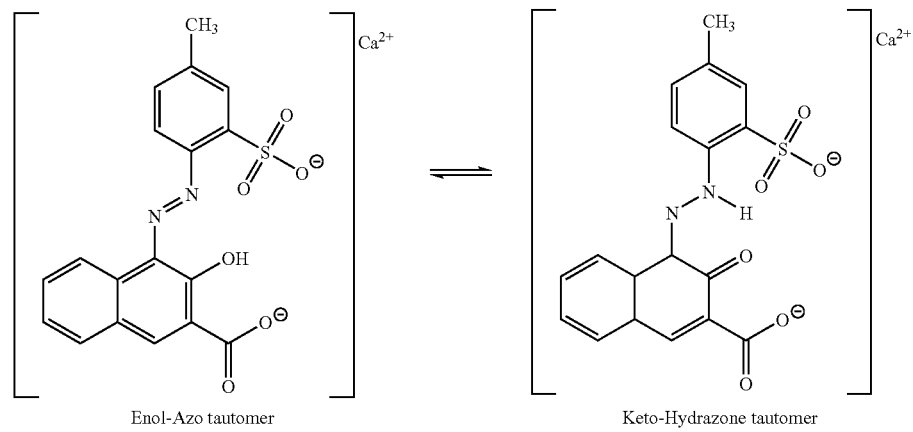

Enol-Azo tautomer          Keto-Hydrazone tautomer

It is also understood that formula (1) denotes both such tautomer forms. Due to the structural nature of monoazo laked pigments being ionic salts, it is possible to have compounds that associate non-covalently with the pigment, such as organic or inorganic ionic compounds that can associate directly through ionic or coordination-type bonding, and typically with the counter-cation group like $M^{n+}$. Such ionic compounds are included in a group of compounds which herein are referred to as "stabilizers", and that function to reduce the surface tension of the pigment particle and neutralize attractive forces between two or more pigment particles or structures, thereby stabilizing the chemical and physical structure of the pigment.

The term "precursor" as used in "precursor to the organic pigment" can be any chemical substance that is an advanced intermediate in the total synthesis of a compound (such as the organic pigment). In embodiments, the organic pigment and the precursor to the organic pigment may or may not have the same functional moiety. In embodiments, the precursor to the organic pigment may or may not be a colored compound. In still other embodiments, the precursor and the organic pigment can have different functional moieties. In embodiments, where the organic pigment and the precursor have a structural feature or characteristic in common, the phrase "organic pigment/pigment precursor" is used for convenience rather than repeating the same discussion for each of the organic pigment and the pigment precursor.

The term "complementary" as used in "complementary functional moiety" of the stabilizer indicates that the complementary functional moiety is capable of noncovalent chemical bonding with the functional moiety of the organic pigment and/or the functional moiety of a pigment precursor.

The functional moiety (denoted as FM) of the organic pigment/precursor can be any suitable moiety capable of non-covalent bonding with the complementary functional group of the stabilizer. Illustrative functional moieties of the organic pigment/precursor include (but are not limited to) the following: sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, indenones, and the like.

Pigment precursors for making both monoazo and monoazo laked nanopigments consist of a substituted aniline precursor (denoted as "DC" in Table 1) which forms the diazo group $G_d$ of Formula (1), a nucleophilic or basic coupling compound (denoted as "CC" in Tables 2-6) which leads to the coupling group G. of Formula (1), and for monoazo laked pigments specifically, a cation salt is also present which is preferably a metal (denoted as "M" as shown in Formula (1)). Representative examples of the aniline precursor of monoazo and laked monoazo pigments that have the functional moiety capable of non-covalent bonding with a complementary functional group on the stabilizer, include (but are not limited to) the following structures (with the functional moiety "FM" denoted, if applicable).

In an embodiment, the substituted aniline precursor (DC) which leads to the diazonium group can be of the formula (2):

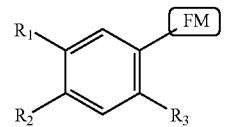

Formula (2)

where $R_1$, $R_2$, and $R_3$ independently represent H, a straight or branched alkyl group of from about 1 to about 10 carbon atoms (such as methyl, ethyl, propyl, butyl, and the like), halogen (such as Cl, Br, I), $NH_2$, $NO_2$, $CO_2H$, $CH_2CH_3$, and the like; and functional moiety FM represents $SO_3H$, —C(=O)—NH-Aryl-$SO_3^-$ where the aryl group can be unsubstituted or substituted with either halogens (such as Cl, Br, I, F) or alkyl groups having from about 1 to about 10 carbons (such as methyl, ethyl, propyl, butyl and the like) $CO_2H$, halogen (such as Cl, Br, I), $NH_2$, —C(=O)—$NH_2$, and the like. The substituted aniline precursor (DC) can be also be Tobias Acid, of the formula (3):

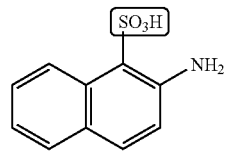

Formula (3)

Specific examples of types of aniline precursors (DC) that are used to make the diazo group $G_d$ in the monoazo and laked monoazo pigments include those of Table 1:

TABLE 1

| Precursor to Group $G_d$ | Functional Moiety FM | $R_1$ | $R_2$ | $R_3$ |
|---|---|---|---|---|
| DC1 | $SO_3H$ | $CH_3$ | H | $NH_2$ |
| DC2 | $SO_3H$ | $CH_3$ | Cl | $NH_2$ |
| DC3 | $SO_3H$ | Cl | $CH_3$ | $NH_2$ |
| DC4 | $SO_3H$ | Cl | $CO_2H$ | $NH_2$ |
| DC5 | $SO_3H$ | Cl | $CH_2CH_3$ | $NH_2$ |
| DC6 | $SO_3H$ | Cl | Cl | $NH_2$ |
| DC7 | $SO_3H$ | H | $NH_2$ | H |
| DC8 | $SO_3H$ | H | $NH_2$ | $CH_3$ |
| DC9 | $SO_3H$ | $NH_2$ | H | Cl |
| DC10 | $SO_3H$ | H | H | $NH_2$ |
| DC11 | $SO_3H$ | H | $NH_2$ | H |
| DC12 | $SO_3H$ | $NO_2$ | $NH_2$ | H |
| DC13 | —C(=O)—NH—C6H4—$SO_3^\ominus$ | $NH_2$ | $CH_3$ | H |

TABLE 1-continued

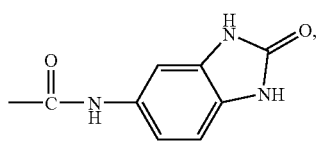

| Precursor to Group $G_d$ | Functional Moiety FM | $R_1$ | $R_2$ | $R_3$ |
|---|---|---|---|---|
| DC14 | $CO_2H$ | H | H | $NH_2$ |
| DC15 | Cl | H | H | $NH_2$ |
| DC16 | $NH_2$ | $CH_3$ | H | H |
| DC17 | $NH_2$ | H | $CH_3$ | H |
| DC18 | —C(=O)—$NH_2$ | $NH_2$ | $CH_3$ | H |
| DC19 | —C(=O)—$NH_2$ | H | $NH_2$ | H |
| DC20 | $NH_2$ | H | H | H |
| DC21 | 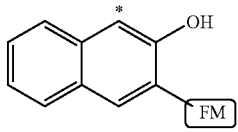 "Tobias Acid" | | | |
| DC22 | $SO_2NHCH_3$ | $OCH_3$ | $NH_2$ | $CH_3$ |
| DC23 | $CO_2CH_3$ | H | H | $NH_2$ |

In an embodiment, the coupling group $G_c$ of Formula (1) can include β-naphthol and derivatives of Formula (4), naphthalene sulfonic acid derivatives of Formulas (5) and (6), pyrazolone derivatives of Formula (7), acetoacetic arylide derivatives of Formula (8), and the like. In formulas (4)-(8), the asterisk "*" denotes the point of coupling or attachment to the monoazo (N=N) linkage.

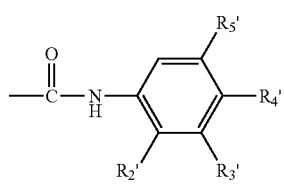

Formula (4)

where FM represents H, $CO_2H$, $SO_3H$, —C(=O)—NH-Aryl-$SO_3^-$ where the aryl group can be unsubstituted or substituted with either halogens (such as Cl, Br, I, F) or alkyl groups having from about 1 to about 10 carbons (such as methyl, ethyl, propyl, butyl and the like) $CO_2H$, halogen (such as Cl, Br, I), $NH_2$, —C(=O)—$NH_2$, substituted benzamides such as:

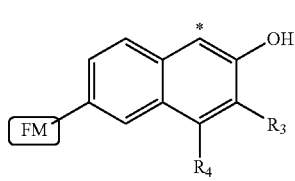

wherein groups $R_2'$ $R_3'$, $R_4'$ and $R_5'$ can independently be H, alkyl groups having from about 1 to 10 carbons (such as methyl, ethyl, propyl, butyl, and the like), alkoxyl groups (such as $OCH_3$, $OCH_2CH_3$, and the like), hydroxyl or halogen (such as Cl, Br, I, F) or nitro $NO_2$; or benzimidazolone amides such as:

and the like.

Formula (5)

where FM represents preferably $SO_3H$, but also can represent $CO_2H$, —C(=O)—NH-Aryl-$SO_3^-$ where the aryl group can be unsubstituted or substituted with either halogens (such as Cl, Br, I, F) or alkyl groups having from about 1 to about 10 carbons (such as methyl, ethyl, propyl, butyl and the like) $CO_2H$, halogen (such as Cl, Br, I), $NH_2$, —C(=O)—$NH_2$ groups $R_3$ and $R_4$ independently represent H, $SO_3H$, and the like.

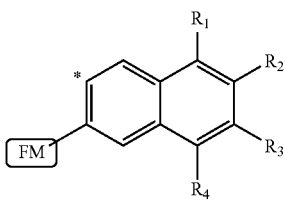

Formula (6)

where FM represents preferably $SO_3H$, but also can represent $CO_2H$, $-C(=O)-NH-Aryl-SO_3^-$ where the aryl group can be unsubstituted or substituted with either halogens (such as Cl, Br, I, F) or alkyl groups having from about 1 to about 10 carbons (such as methyl, ethyl, propyl, butyl and the like) $CO_2H$, halogen (such as Cl, Br, I), $NH_2$, $-C(=O)-NH_2$; $R_1$, $R_2$, $R_3$ and $R_4$ independently represent H, $SO_3H$, $-C(=O)-NH$-Phenyl, and the like.

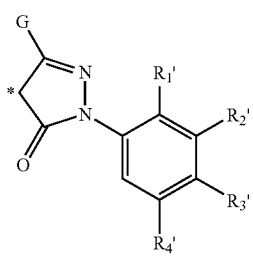

Formula (7)

where G represents $CO_2H$, straight or branched alkyl such as having from 1 to about 10 carbons atoms (such as methyl, ethyl, propyl, butyl, or the like), and the like; and $R_1'$, $R_2'$, $R_3'$ and $R_4'$ independently represent H, halogen (such as Cl, Br, I), $SO_3H$, nitro ($NO_2$) or alkoxyl group such as $OCH_3$ or $OCH_2CH_3$ and the like.

Formula (8)

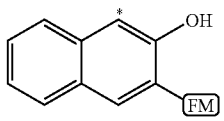

where $R_1'$ represents a straight or branched alkyl group having, for example, from 1 to about 10 carbon atoms (such as methyl, ethyl, propyl, butyl, and the like); $R_2'$ represents a benzimidazolone group:

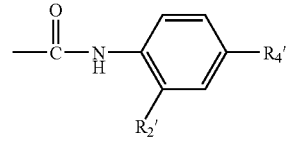

or a substituted aryl group

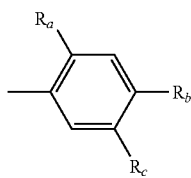

where each of $R_a$, $R_b$, and $R_c$ independently represents H, a straight or branched alkyl group having, for example, from 1 to about 10 carbon atoms (such as methyl, ethyl, propyl, butyl, and the like), alkoxyl groups such as $OCH_3$ or $OCH_2CH_3$ and the like, halogen (such as Cl, Br, I), nitro $NO_2$, and the like.

Representative examples of the nucleophilic coupling component as a precursor of monoazo and laked monoazo pigments which have the functional moiety that is capable of non-covalent bonding with a complementary functional group on the stabilizer, include (but are not limited to) the following structures shown in Tables 2-6 (with the functional moiety "FM" denoted, if applicable):

TABLE 2

| Precursor to group $G_c$ | Class of Coupling Component | Functional Moiety FM |
|---|---|---|
| CC1 | β-Naphthol | H |
| CC2 | β-oxynahthoic acid ("BONA") | $CO_2H$ |
| CC3 | Naphthol AS derivatives | $-\overset{O}{\underset{}{C}}-\underset{H}{N}-\text{(aryl with } R_4', R_2')$ |
| CC6 | Benzimidazolone | $-\overset{O}{\underset{}{C}}-\underset{H}{N}-\text{(benzimidazolone)}$ |

\* = point of coupling to diazo component

TABLE 3

| Precursor to group $G_c$ | Class of Coupling Component | FM | $R_3$ | $R_4$ |
|---|---|---|---|---|
| CC4a | Naphthalene Sulfonic Acid derivatives | $SO_3H$ | H | H |
| CC4b | Naphthalene Sulfonic Acid derivatives | $SO_3H$ | $SO_3H$ | H |

\* = point of coupling to diazo component

TABLE 4

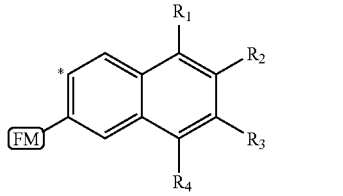

| Precursor to group $G_c$ | Class of Coupling Component | FM | $R_1$ | $R_2$ | $R_3$ | $R_4$ |
|---|---|---|---|---|---|---|
| CC5 | Naphthalene Sulfonic Acid derivatives | SO$_3$H | 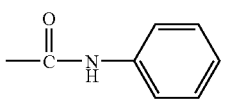 | H | H | SO$_3$H |

* = point of coupling to diazo component

TABLE 5

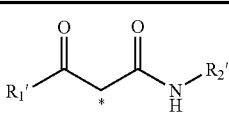

| Precursor to group $G_c$ | Class of Coupling Component | G | $R_1'$ | $R_2'$ | $R_3'$ | $R_4'$ |
|---|---|---|---|---|---|---|
| CC7 | Pyrazolone deriv. | CO$_2$H | H | H | SO$_3$H | H |
| CC8 | Pyrazolone deriv. | CH$_3$ | H | H | SO$_3$H | H |
| CC9 | Pyrazolone deriv. | CH$_3$ | H | SO$_3$H | H | H |
| CC10 | Pyrazolone deriv. | CH$_3$ | Cl | H | SO$_3$H | Cl |

* = point of coupling to diazo component

TABLE 6

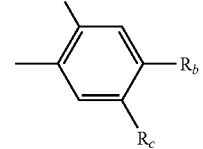

| Precursor to group $G_c$ | Class of Coupling Component | $R_1'$ | $R_2'$ | $R_a$ | $R_b$ | $R_c$ |
|---|---|---|---|---|---|---|
| CC11 | Acetoacetic arylide | CH$_3$ | 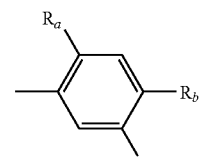 | H | H | H |
| CC12 | Acetoacetic arylide | CH$_3$ | | CH$_3$ | H | H |

TABLE 6-continued

[Structure: R₁'—C(=O)—CH(*)—C(=O)—NH—R₂']

| Precursor to group $G_c$ | Class of Coupling Component | $R_1'$ | $R_2'$ | | $R_a$ | $R_b$ | $R_c$ |
|---|---|---|---|---|---|---|---|
| CC13 | Acetoacetic arylide | CH₃ | [phenyl ring with $R_a$, $R_b$, $R_c$ substituents] | | Cl | H | H |
| CC14 | Acetoacetic arylide | CH₃ | [phenyl ring with $R_a$, $R_b$, $R_c$ substituents] | | H | OCH₃ | H |
| CC15 | Acetoacetic benzimidazolne | CH₃ | [benzimidazolone structure] | | — | — | — |

* = point of coupling to diazo component

The laked monoazo organic pigments, and in some embodiments, the precursor of such pigments, also generally include one or more counterions as part of the overall structure. Such counterions can be, for example, any suitable counterion including those that are well known in the art. Such counterions can be, for example, cations or anions of either metals or non-metals that include N, P, S and the like, or carbon-based cations or anions. Examples of suitable cations include ions of Ba, Ca, Cu, Mg, Sr, Li, Na, K, Cs, Mn, Cu, Cr, Fe, Ti, Ni, Co, Zn, V, B, Al, Ga, and other metal ions, as well as ammonium and phosphonium cations, mono-, di-, tri-, and tetra-substituted ammonium and phosphonium cations, where the substituents can be aliphatic alkyl groups, such as methyl, ethyl, butyl, stearyl and the like, as well as aryl groups such as phenyl or benzyl and the like.

Representative examples of azo and azo laked pigments comprised from a selection of substituted aniline precursors (denoted DC), including Tobias Acid, nucleophilic coupling components (denoted as CC) and optionally metal salts (denoted as M) to provide the counter-cation $MW^{n+}$ of laked pigments as in formula (1), are listed in Table 7. Other pigment structures may also be formed from other combinations of DC and CC and optionally metal cation salt (M) that are not shown in Table 7.

TABLE 7

$$\left[ G_d - N = N - G_c \right] \cdot M$$

| Color Index # (C.I.) | Color Index (C.I.) Name | Laked Pigment Class | $G_d$ precursor | $G_c$ precursor | Metal Salt M |
|---|---|---|---|---|---|
| 15500:1 | Red 50:1 | 0-Naphthol Lakes | DC14 | CC1 | ½Ba |
| 15510:1 | Orange 17 | 0-Naphthol Lakes | DC7 | CC1 | Ba |
| 15510:2 | Orange 17:1 | 0-Naphthol Lakes | DC7 | CC1 | ? Al |
| 15525 | Red 68 | 0-Naphthol Lakes | DC4 | CC1 | 2 Ca |
| 15580 | Red 51 | 0-Naphthol Lakes | DC8 | CC1 | Ba |
| 15585 | Red 53 | 0-Naphthol Lakes | DC3 | CC1 | 2 Na |
| 15585:1 | Red 53:1 | 0-Naphthol Lakes | DC5 | CC1 | Ba |
| 15585:3 | Red 53:3 | 0-Naphthol Lakes | DC21 | CC1 | Sr |
| 15602 | Orange 46 | 0-Naphthol Lakes | DC21 | CC1 | Ba |
| 15630 | Red 49 | 0-Naphthol Lakes | DC21 | CC1 | 2 Na |
| 15630:1 | Red 49:1 | 0-Naphthol Lakes | DC21 | CC1 | Ba |
| 15630:2 | Red 49:2 | 0-Naphthol Lakes | DC21 | CC1 | Ca |

TABLE 7-continued $$\left[ \begin{array}{c} \boxed{G_d} \\ N=N \\ \boxed{G_c} \end{array} \right] \cdot M$$

| Color Index # (C.I.) | Color Index (C.I.) Name | Laked Pigment Class | $G_d$ precursor | $G_c$ precursor | Metal Salt M |
|---|---|---|---|---|---|
| 15630:3 | Red 49:3 | 0-Naphthol Lakes | DC21 | CC1 | Sr |
| 15800 | Red 64 | 0-oxynaphthoic acid (BONA) Lakes | DC20 | CC2 | ½Ba |
| 15800:1 | Red 64:1 | 0-oxynaphthoic acid (BONA) Lakes | DC20 | CC2 | ½Ca |
| 15800:2 | Brown 5 | 0-oxynaphthoic acid (BONA) Lakes | DC20 | CC2 | ½Cu |
| 15825:2 | Red 58:2 | 0-oxynaphthoic acid (BONA) Lakes | DC9 | CC2 | Ca |
| 15825:4 | Red 58:4 | 0-oxynaphthoic acid (BONA) Lakes | DC9 | CC2 | Mn |
| 15850:1 | Red 57:1 | 0-oxynaphthoic acid (BONA) Lakes | DC1 | CC2 | Ca |
| 15860:1 | Red 52:1 | 0-oxynaphthoic acid (BONA) Lakes | DC3 | CC2 | Ca |
| 15860:2 | Red 52:2 | 0-oxynaphthoic acid (BONA) Lakes | DC3 | CC2 | Mn |
| 15865:1 | Red 48:1 | 0-oxynaphthoic acid (BONA) Lakes | DC2 | CC2 | Ba |
| 15865:2 | Red 48:2 | 0-oxynaphthoic acid (BONA) Lakes | DC2 | CC2 | Ca |
| 15865:3 | Red 48:3 | 0-oxynaphthoic acid (BONA) Lakes | DC2 | CC2 | Sr |
| 15865:4 | Red 48:4 | 0-oxynaphthoic acid (BONA) Lakes | DC2 | CC2 | Mn |
| 15865:5 | Red 48:5 | 0-oxynaphthoic acid (BONA) Lakes | DC2 | CC2 | Mg |
| 15867 | Red 200 | 0-oxynaphthoic acid (BONA) Lakes | DC5 | CC2 | Ca |
| 15880:1 | Red 63:1 | 0-oxynaphthoic acid (BONA) Lakes | DC21 | CC2 | Ca |
| 15880:2 | Red 63:2 | 0-oxynaphthoic acid (BONA) Lakes | DC21 | CC2 | Mn |
| 15892 | Red 151 | Naphthol AS Lakes | DC10 | CC3 ($R_2'$ = H $R_4'$ = $SO_3H$) | Ba |
| 15910 | Red 243 | Naphthol AS Lakes | DC2 | CC3 ($R_2'$ = $OCH_3$ $R_4'$ = H) | ½Ba |
| 15915 | Red 247 | Naphthol AS Lakes | DC13 | CC3 ($R_2'$ = H $R_4'$ = $SO_3H$) | Ca |
| 15985:1 | Yellow 104 | Naphthalene Sulfonic Acid Lakes | DC7 | CC4a | ? Al |
| 15990 | Orange 19 | Naphthalene Sulfonic Acid Lakes | DC15 | CC4a | ½Ba |
| 16105 | Red 60 | Naphthalene Sulfonic Acid Lakes | DC14 | CC4b | ⅔Ba |
| 18000:1 | Red 66 | Naphthalene Sulfonic Acid Lakes | DC16 | CC5 | ½Ba, Na |
| 19140:1 | Yellow 100 | Pyrazolone Lakes | DC7 | CC7 | Al |
| 18792 | Yellow 183 | Pyrazolone Lakes | DC6 | CC9 | Ca |
| 18795 | Yellow 191 | Pyrazolone Lakes | DC2 | CC9 | Ca |
| — | Yellow 190 | Pyrazolone Lakes | DC6 | CC10 | Ca |
| 13980 | Yellow 151 | Azo-Benzimidazolone | DC14 | CC15 | none |
| 12513 | Red 175 | Azo-Benzimidazolone | DC23 | CC15 | none |
| 12516 | Red 185 | Azo-Benzimidazolone | DC22 | CC15 | none |

A stabilizer can be any compound that has the function to reduce the surface tension of the pigment particle and neutralize attractive forces between two or more pigment particles or structures, thereby stabilizing the chemical and physical structure of the primary pigment particle. In this manner, the stabilizer is capable of limiting the extent of pigment particle or molecular self-assembly so as to produce predominantly nanoscale pigment particles, be they primary nanoparticles (crystallites) which are typically less than 50 nm, or tightly-bound nanoscale aggregrates that are typically less than 100-150 nm. In addition to the functional moiety having high pigment affinity (referred to hereafter as "pigment-affinic" functional moiety), these stabilizer compounds can also possess one or more hydrophobic groups, such as long alkyl hydrocarbon groups, or alkyl-aryl hydrocarbon groups, wherein the alkyl groups can be linear, cyclic or branched in structure and have at least 6 or more carbons in total. The presence of the additional hydrophobic groups in such stabilizers can serve several functions: (1) to provide a sterically bulky layer surrounding the pigment particle, thereby preventing or limiting the approach of other pigment particles or molecules that results in uncontrolled aggregation, and ultimately particle growth; and (2) to help compatibilize the pigment for better dispersability in the targeted vehicle or matrix. Such compounds having both a pigment-affinic functional moiety that associates noncovalently with the pigment, as well as one or more sterically bulky hydrocarbon groups that provide a surface barrier to other pigment particles, are often referred to as "steric stabilizers" and have been used in various ways to alter the surface characteristics of conventional pigments and other particles requiring stabilization (for example, latex particles in paints, metal oxide nanoparticles in anti-scratch coatings, among others).

The functional group on the stabilizer has a structure that is both complementary and has high affinity for non-covalent bonding association with the one or more functional moieties on the pigment. Suitable complementary functional groups on the stabilizer include the following: sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary or secondary amides, primary or secondary amines, hydroxyl, ketone, aldehyde, oxime, hydroxylamino, enamines (or Schiff base), porphyrins, (phthalo)cyanines, urethane or carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, indenones, and the like.

The stabilizer compound should have a hydrocarbon moiety that provides sufficient steric bulk to enable the function of the stabilizer to regulate pigment particle size. The hydrocarbon moiety in embodiments is predominantly aliphatic, but in other embodiments can also incorporate aromatic groups, and generally contains at least 6 carbon atoms, such as at least 12 carbons or at least 16 carbons, and not more than about 100 carbons, but the actual number of carbons can be outside of these ranges. The hydrocarbon moiety can be either linear, cyclic or branched, and in embodiments is desirably branched, and may or may not contain cyclic moieties such as cycloalkyl rings or aromatic rings. The aliphatic branches are long with at least 2 carbons in each branch, such as at least 6 carbons in each branch, and not more than about 100 carbons.

It is understood that the term "steric bulk" is a relative term, based on comparison with the size of the pigment or pigment precursor to which it becomes non-covalently associated. In embodiments, the phrase "steric bulk" refers to the situation when the hydrocarbon moiety of the stabilizer compound that is coordinated to the pigment/precursor surface, occupies a 3-dimensional spatial volume that effectively prevents the approach or association of other chemical entities (e.g. colorant molecules, primary pigment particles or small pigment aggregate) toward the pigment/precursor surface. Thus, the stabilizer should have its hydrocarbon moiety large enough so that as several stabilizer molecules become non-covalently associated with the chemical entity (pigment or precursor), the stabilizer molecules act as surface barrier agents for the primary pigment particles and effectively encapsulates them, and thereby limits the growth of the pigment particles and affording only nanoparticles of the pigment. For example, for the pigment precursor Lithol Rubine and for the organic pigment Pigment Red 57:1, the following illustrative groups on a stabilizer are considered to have adequate "steric bulk" so as to enable the stabilizer to limit the extent of pigment self-assembly or aggregation and mainly produce pigment nano-sized particles:

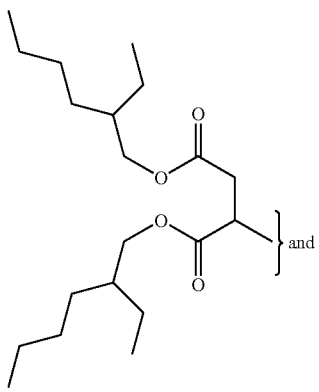

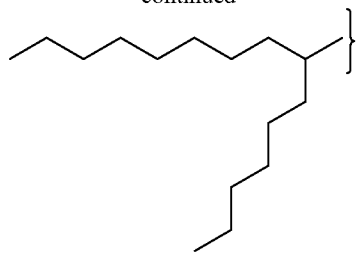

Classes of suitable stabilizer compounds include the following: the mono- and di-carboxylic acids, mono- and di-esters, and mono- and di-primary amide derivatives of long-chain, branched, or cyclic alkanes, alkenes, and alkylarenes; the mono- and di-carboxylic acids, mono- and di-esters, and mono- and di-primary amide derivatives of heterocyclic compounds such as pyridine, piperidine, piperazine, morpholine and pyrroles; monosubstituted pyridine, piperazine, piperidine, morpholine, pyrrole, imidazole, thiazole and their cationic salts, wherein the substituent is a long-chain or branched aliphatic hydrocarbon; poly(vinyl pyrrolidone) and copolymers of poly(vinyl pyrrolidone) with α-olefins or other ethylenically unsaturated monomer compounds, such as for example poly(vinyl pyrrolidone-graft-1-hexadecane) and poly(vinyl pyrrolidone-co-eicosene) and the like; poly(vinyl imidazole) and copolymers of poly(vinyl imidazole) with α-olefins or other ethylenically unsaturated monomer compounds; poly(vinyl pyridine) and copolymers of poly(vinyl pyridine) with α-olefins or styrene, or other ethylenically unsaturated monomer compounds; long-chain or branched aliphatic primary amides and amidines, including Guerbet-type primary amides and amidines; semicarbazides and hydrazones of long-chain aliphatic and/or branched aldehydes and ketones; mono-substituted ureas and N-alkyl-N-methyl ureas, wherein the substituent is a long-chain or branched aliphatic hydrocarbon; mono-substituted monosubstituted guanidines and guanidinium salts, wherein the substituent is a long-chain or branched aliphatic hydrocarbon; mono- and di-substituted succinimides, such as 2-alkyl- and 2,3-dialkyl-succinimides, and mono- and di-substituted succinic acids or their esters, wherein one or more alkyl substituent is comprised of a long-chain or branched aliphatic hydrocarbon having between 6 and 50 carbon atoms; mixtures thereof; and the like.

Representative examples of stabilizer compounds that have both the functional group that non-covalently associates with the pigment and the sterically bulky hydrocarbon moiety, include (but are not limited to) the following compounds:

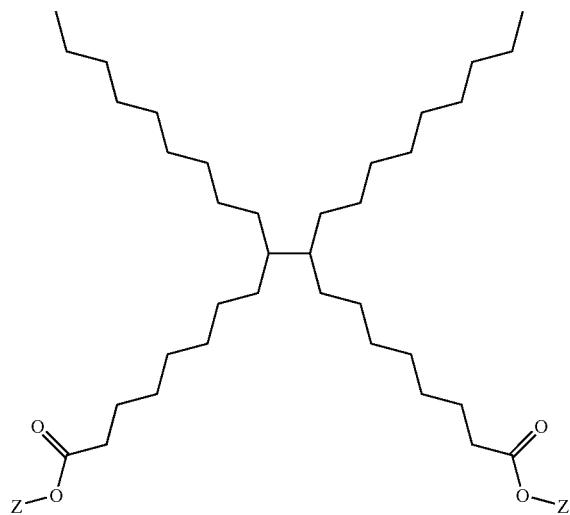
C36 Dimer Diacid
Z = H ; Metal cations such as Na, K, Li, Ca, Ba, Sr, Mg, Mn, Al, Cu, B, and others;
Organic cations such as $NH_4^+$, $NR_4^+$, $PR_4^+$, and others
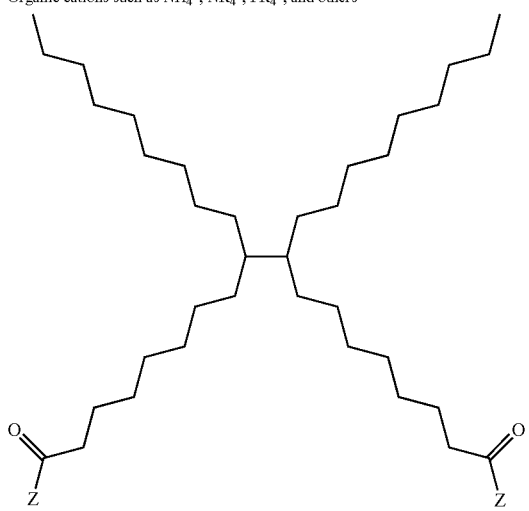
Z = H ; OH, $NH_2$, NHR', OR'
Where R' = $C_1$-$C_6$ alkyl, or $C_6$-$C_{14}$ aryl
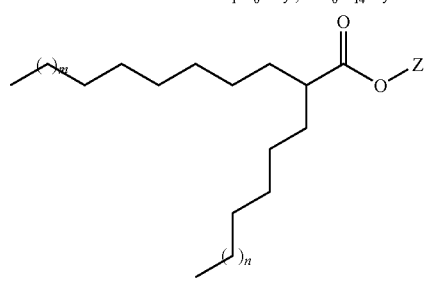
Z = H ; Metal cations such as Na, K, Li, Ca, Ba, Sr, Mg, Mn, Al, Cu, B, and others;
Organic cations such as $NH_4^+$, $NR_4^+$, $PR_4^+$, and others
and methylmr units (m+n) >1

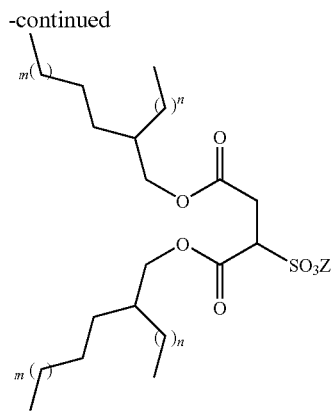

Z = H ; Metal cations such as Na, K, Li, Ca, Ba, Sr, Mg, Mn, Al, Cu, B, and others;
Organic cations such as $NH_4^+$, $NR_4^+$, $PR_4^+$, and others and methylene units (m+n) >1
per branch

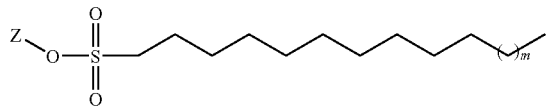

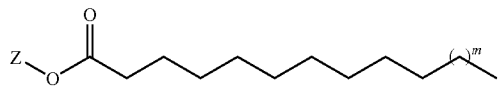

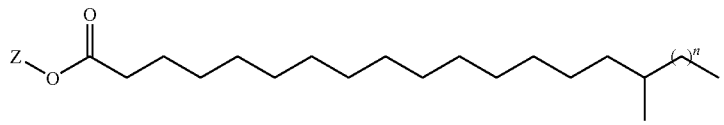

Z = H ; Metal cations such as Na, K, Li, Ca, Ba, Sr, Mg, Mn, Al, Cu, B, and others;
Organic cations such as $NH_4^+$, $NR_4^+$, $PR_4^+$, and others and methylene units m ≥ 1
and for iso-staric acid, n ≤ 1 wherein m and n denotes the number of repeated methylene units, and where m can range between 1 and 50, and n can range between 1 and 5, however the values can also be outside these ranges. Additional examples of suitable stabilizer compounds include (but are not limited to) the following compounds:

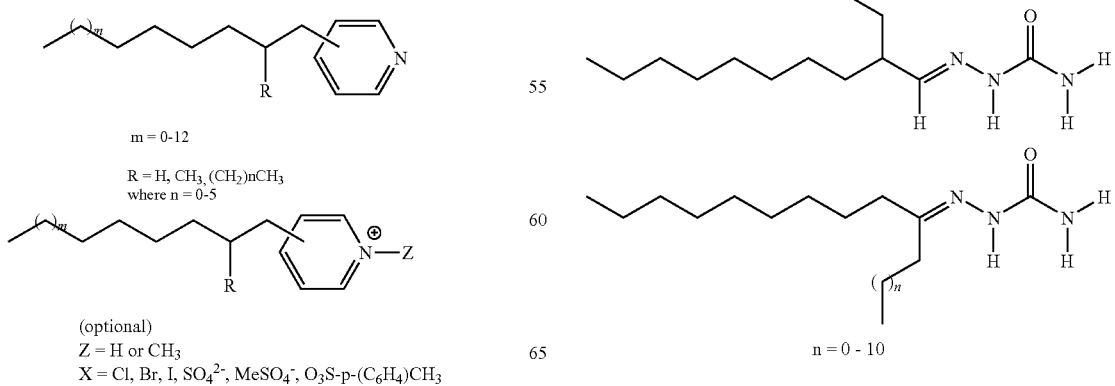

m = 0-12

R = H, $CH_3$, $(CH_2)nCH_3$
where n = 0-5

(optional)
Z = H or $CH_3$
X = Cl, Br, I, $SO_4^{2-}$, $MeSO_4^-$, $O_3S$-p-$(C_6H_4)CH_3$ n = 0 - 10

-continued

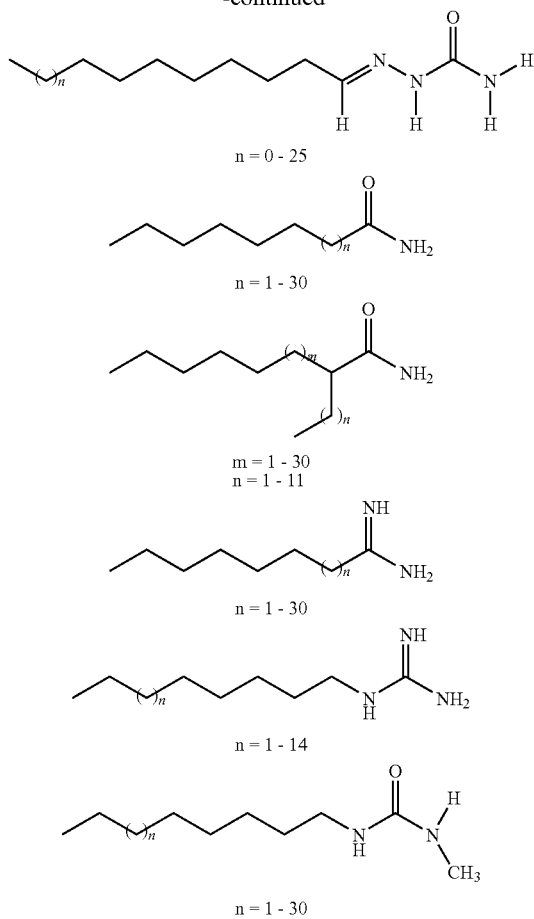

In additional embodiments, other stabilizer compounds having different structures than those described previously may be used in addition to sterically bulky stabilizer compounds, to function as surface active agents (or surfactants) that either prevent or limit the degree of pigment particle aggregation. Representative examples of such surface active agents include, but are not limited to, rosin natural products such as abietic acid, dehydroabietic acid, pimaric acid, rosin soaps (such as the sodium salt of the rosin acids), hydrogenated derivatives of rosins and their alkyl ester derivatives made from glycerol or pentaerythritol or other such hydrocarbon alcohols, acrylic-based polymers such as poly(acrylic acid), poly(methyl methacrylate), styrene-based copolymers such as poly(styrene sodio-sulfonate) and poly(styrene)-co-poly(alkyl (meth)acrylate), copolymers of α-olefins such as 1-hexadecene, 1-octadecene, 1-eicosene, 1-triacontene and the like, copolymers of 4-vinyl pyridine, vinyl imidazole, and vinyl pyrrolidinone, polyamides, polyesters, polyesteramides and copolymers thereof, oligomers of amides, esters, and lactones, copolymers of acetals and acetates, such as the copolymer poly(vinylbutyral)-co-(vinyl alcohol)-co-(vinyl acetate).

The types of non-covalent chemical bonding that can occur between the functional moiety of the precursor/pigment and the complementary functional group of the stabilizer are, for example, van der Waals' forces, ionic or coordination bonding, hydrogen bonding, and/or aromatic pi-stacking bonding. In embodiments, the non-covalent bonding is predominately ionic bonding, but can include hydrogen bonding and aromatic pi-stacking bonding as additional or alternative types of non-covalent bonding between the functional moieties of the stabilizer compounds and the precursor/pigment.

The "average" pigment particle size, which is typically represented as $d_{50}$, is defined as the median particle size value at the 50th percentile of the particle size distribution, wherein 50% of the particles in the distribution are greater than the $d_{50}$ particle size value and the other 50% of the particles in the distribution are less than the $d_{50}$ value. Average particle size can be measured by methods that use light scattering technology to infer particle size, such as Dynamic Light Scattering. The term "particle diameter" as used herein refers to the length of the pigment particle at the longest dimension (in the case of acicular shaped particles) as derived from images of the particles generated by Transmission Electron Microscopy (TEM). The term "nano-sized", "nanoscale", "nanoscopic", or "nano-sized pigment particles" refers to for instance, an average particle size, $d_{50}$, or an average particle diameter of less than about 150 nm, such as of about 1 nm to about 100 nm, or about 10 nm to about 150 nm, or about 50 to about 80 or to about 100 nm. Geometric standard deviation is a dimensionless number that typically estimates a population's dispersion of a given attribute (for instance, particle size) about the median value of the population and is derived from the exponentiated value of the standard deviation of the log-transformed values. If the geometric mean (or median) of a set of numbers $\{A_1, A_2, \ldots, A_n\}$ is denoted as $\mu_g$, then the geometric standard deviation is calculated as:

$$\sigma_g = \exp\sqrt{\frac{\sum_{i=1}^{n}(\ln A_i - \ln \mu_g)^2}{n}}$$

In general, the methods of making nanoscale particles of azo or laked azo pigments such as those listed in Table 7, and similarly other nanoscale particles of azo type dyes such as disazo and disazo laked pigments, is a process that involves one or more reaction steps, and in embodiments, at least one of these reaction steps is performed within a microreactor or micromixer. A diazotization reaction is a key reaction step for synthesis of the monoazo and laked monoazo pigments, whereby a suitably substituted aniline precursor (denoted as diazo component DC) such as those listed in Table 1, and Formulas (2) and (3), is either directly or indirectly converted first to a diazonium salt using standard procedures, such as that which includes treatment with an effective diazotizing agent such as nitrous acid $HNO_2$ (which is generated in situ by mixing sodium nitrite with dilute protic acid solution such as hydrochloric acid), or nitrosyl sulfuric acid (NSA), which is commercially available or can be prepared by mixing sodium nitrite in concentrated sulfuric acid. Initially, it may be necessary to first dissolve the precursor substituted aniline in alkaline solution (such as aqueous potassium hydroxide solution, or ammonia water) followed by treatment with the diazotizing agent and acid solution, so as to generate the diazonium salt. The diazotization procedure is typically carried out at cold temperatures so as to keep the diazonium salt stable, and the resulting reaction mixture will comprise mainly the diazonium salt either dissolved or suspended as a precipitate in acidic medium. For laked pigments such as laked monoazo pigments, if desired and effective, an aqueous solution of the metal salt ($M^{n+}$) can be optionally added that will define the specific composition of the desired monoazo laked pigment product, such as those listed in Table 7.

A second solution or suspension is prepared by dissolving or suspending the nucleophilic coupling component (denoted as CC, such as those shown in Tables 2-6, and Formulas (4)-(8)) mainly into water, which may optionally contain another liquid such as an organic solvent (for example, isopropanol, tetrahydrofuran, methanol, or other). Acids or bases can be used to render the coupling component into solution or a fine suspension which can improve reactivity with the diazonium salt solution, and additionally any buffers or surface active agents including the sterically bulky stabilizer compounds such as those described previously, may be added to the second solution of coupling component.

The first diazonium salt solution or suspension is combined in any suitable manner with the second coupling component solution or suspension, to produce a colored solid that is typically obtained as suspended particles in the aqueous medium. This reaction step may be carried out, using appropriate processing conditions, in either batch mode or by continuous processing, including the use of a microreactor or micromixer unit. Both azo and laked azo pigments are generated in this manner. For preparation of laked pigments, an alternative series of reaction steps can be used that begins with combining the first diazonium salt solution, which is devoid of any metal cation salt, with the second coupling component solution, in either a batch process or a continuous (microreactor) process, to prepare a water-soluble dye that is a synthetic precursor to the actual insoluble pigment. The water-soluble dye precursor is then rendered into homogeneous solution or a fine suspension by treatment with either acids or bases, and the resultant homogeneous solution of the dye is then further reacted with a solution of the appropriate metal cation salt, in either a batch process or a continuous (microreactor or micromixer) process, to precipitate a colored pigment product as fine nanoparticles. There are several chemical as well as physical processing factors that can affect the final particle size and distribution of the pigment nanoparticles, including stoichiometries of the DC and CC starting reactants, (optional) metal salt, surface active agents, and stabilizer compounds, the concentrations of chemical species in the liquid medium, pH of liquid medium, temperature, addition rate, order of addition, agitation rate, post-reaction treatments such as heating, isolation and washing of particles, and drying conditions. If effective and desired, a variety of finishing steps may be performed to obtain the desired properties of the nanoscale pigment particles, which include careful heating for narrowing the distribution of particle sizes and/or shapes, or optional surface treatment with resinous compounds to improve the pigment dispersion properties.

The microreactor process uses pumps to feed the reactant solutions into the microreactor where they are well mixed and react to form the product pigment suspension. Tubing or other connections can be used to interconnect the feed tanks to the pumps and these to the microreactor. An outlet tubing line can then be connected to a product receiving vial or other product container. For the purpose of this disclosure, a microreactor is defined as any mechanical assembly having a channel dimension, through which a fluid flows, of less than 1 mm. Specifically, the microreactor used in embodiments is a commercial CYTOS™ Lab System, manufactured by CPC Technologies. The microreactor used in embodiments is defined as the combination of the CYTOSO Lab System Microreactor unit and a number of CYTOS™ Lab System Residence Time units. For each example provided, the configuration of the microreactor will be defined (i.e. microreactor unit+X number of retention time units). The CYTOS™ Lab System Microreactor unit has a total process fluid volume of 1.8 mL while the residence time units each hold a process fluid volume of 15 mL. Each unit consists of a series of plates laminated together to form fluid flow channels for the process and heat exchange streams. This configuration thus allows the reaction temperature to be controlled by flowing independently a heat exchange medium through the microreactor that does not contact directly the process streams. Of course, it is understood and will be apparent that the process described herein is not limited to this particular microreactor configuration. Rather, the process is applicable to any device that leads to the conveying of fluids in channels less than 1 mm in laminar flow for the purpose of synthesizing and precipitating nanoscale particles of azo pigments, which may involve a laking reaction step, brought about by the contacting or combining of two or more streams over a specified duration of time in a confined flow environment. For example the microreactor can be replaced by a micromixer (such as for example the Caterpillar mixer model CPMM-R300 purchased from Institut für Mikrotechnik Mainz GmbH) to provide good mixing of the two fluids and in addition a downstream tube of the appropriate size to achieve a desired residence time.

An exemplary diagram of the process of the disclosure is shown in FIG. 1.

The process in an exemplary embodiment of the disclosure is operated with two feed streams to the microreactor and one product stream, although other configurations may be used. One feed stream contains the precursor dye and a second feed stream contains a metal-salt solution (in this example $CaCl_2$). The sterically bulky stabilizer compound and surfactant may be added in the precursor dye stream or as separate streams. However, the sterically bulky stabilizer compound and surfactant should not be included with the metal-salt solution, as this would lead to premature precipitation of these materials. In this embodiment, the precursor dye stream contains both the surfactant and sterically bulky stabilizer compound. The streams are fed into the microreactor at flowrates ranging between about 0.1 and about 100 mL/min each, such as about 10 mL/min each. Pumps convey these fluids from feed tanks to the microreactor. The microreactor is preheated or cooled to operate in a specific temperature window, which is between about 0° C. and about 25° C.

As each stream enters the microreactor it is subdivided and then combined in an intermeshing fashion with the other stream. This intermeshing of the fluid lamellae, of micron scale thickness, leads to rapid mixing of the two or more fluid streams. As the fluids are mixed and progress down the flow channel, laking (ion-exchange reaction leading to precipitation of pigment) takes place. On account of the presence of the sterically bulky stabilizer compound and surfactant, which limits the growth of the pigment to the nanometer scale, the pigment product solution continues to flow through the microreactor (rather than blocking the small channels) even under laminar flow conditions (that is, a Reynold's number less than about 2300). However, in embodiments, the flow in the microreactor or micromixer can be laminar or turbulent, and can have a Reynold's number of, for example, from about 10 to about 10,000. The total residence time in the microreactor is important to the completion of the reaction as insufficient reaction time in the microreactor can lead to incomplete conversion and the formation of larger pigments in the product collection tank. Residence times in the range of about 0.04 seconds to about 2.1 minutes have been used, and it has been found that the best results, smallest nanoparticles formed, are achieved with residence times in the order of a few minutes. However, there is no general limitation on the residence time, and residence times of up to about 1 hour, up to about 2 hours, or even up to about a day or more, could be used. This residence time was unexpected, because it was previously believed that the reaction in batch was instantaneous.

The reaction is conducted in a microreactor, optionally with one or more residence time plates. Any suitable microreactor and residence time plates may be used, and are not limited to the described commercial Cytos reactors. When used, the residence time plates generally contain extended channels with good heat transfer but no active mixing elements.

As needed, the microreactor can be heated or cooled by pumping heating or cooling fluid from an external bath through the heating side of the microreactor. In embodiments, the temperature of the microreactor can lie held at any desired value within wide limits. Likewise, if desired, the feed streams containing the reactants and other inputs can also be fed to the microreactor at the same or different temperatures. Additionally, the reaction can be carried out in the microreactor at pressures between atmospheric pressure and about 100 bar, for example between atmospheric pressure and about 25 bar, although pressures are typically between atmospheric pressure and about 2 bar.

The preparation of mixtures of input materials to form streams of materials may be carried out in advance in micromixers or in upstream mixing zones, as appropriate. The input materials can then be introduced into a microreactor individually or as mixtures.

It is surprising and was unforeseeable that the preparation of nanoscale pigment particle compositions in a microreactor would be possible in this technically elegant manner. In particular, it was surprising and was unforeseeable that such controlled size nanoparticles could be formed in a microreactor, without the particles growing to such a size that would clog the microreactor channels.

After the pigment synthesis is completed, if effective and desired, a variety of finishing steps may be performed to obtain the desired properties of the pigment particles, which include careful heating for narrowing the distribution of particle sizes and/or shapes, or optional surface treatment with resinous compounds to improve the pigment dispersion properties. The isolation of the pigment product can be done in any suitable manner, including separation, extraction, filtration, and/or purification processes or recrystallization is needed, which can be conducted as desired to a desired purity level. For example, the desired nanoparticle product can be subjected to conventional washing steps, can be separated, treated with known absorbents (such as silica, alumina, and clays, if necessary) and the like. The final product can also be dried, for example, by air drying, vacuum drying, or the like. All of these procedures are conventional and will be apparent to those skilled in the art.

In a specific embodiment, the preparation of ultrafine and nanosized particles of the monoazo laked Pigment Red 57:1 was only enabled by the additional use of a sterically bulky stabilizer compound having a functional group that could non-covalently bond to the complementary functional moiety of the pigment as well as branched aliphatic functional groups that could provide steric bulk to the pigment particle surface. In embodiments, particularly suitable sterically bulky stabilizer compounds are branched hydrocarbons with either carboxylate or sulfonate functional groups, compounds such as di[2-ethylhexyl]-3-sulfosuccinate sodium or sodium 2-hexyldecanoate, and the like. The stabilizer compound is introduced as a solution or suspension in a liquid that is predominantly aqueous but may optionally contain a water-miscible organic solvent such as THF, iso-propanol, NMP, Dowanol and the like, to aid dissolution of the stabilizer compound, in an amount relative to colorant moles ranging from about 5 mole-percent to about 100 mole-percent, such as from about 20 mole-percent to about 80 mole-percent, or from about 30 mole-percent to about 70 mole-percent, but the concentrations used can also be outside these ranges and in large excess relative to moles of colorant.

Lastly, the metal cation salt is added to transform the pigment precursor (Lithol Rubine-potassium salt in embodiments) into the desired monoazo laked pigment (Pigment Red 57:1 in embodiments), precipitated as nano-sized pigment particles. In a batch process the aqueous solution of metal salt (calcium chloride in embodiments) with concentration ranging anywhere from 0.1 mol/L to about 2 mol/L, is slowly added dropwise in nearly stoichiometric quantities such as amounts ranging from 1.0 molar equivalents relative to about 2.0 molar equivalents, or from 1.1 to about 1.5 molar equivalents, or from 1.2 to about 1.4 molar equivalents relative to moles of colorant, however the amounts used can also be outside of these ranges and in large excess. In a continuous microreactor process the addition of the metal-salt solution can be done quickly on account of the efficient and fast mixing afforded by the microreactor.

The type of metal salt can have an impact on the extent of forming nano-sized pigment particles of monoazo laked pigments, in particular the type of ligand that is coordinated to the metal cation and the relative ease with which it is displaced by a competing ligand from either the pigment functional moiety or the complementary functional moiety of the stabilizer compound, or both. In embodiments for monoazo laked Pigment Red 57:1, the nano-sized particles are formed using calcium (II) salts with ligands such as chloride, sulfate, acetate, and hydroxide; however a particularly desirable metal salt is calcium chloride for fastest reactivity.

Temperature during the pigment precipitation step using the metal salt solution is also important. In embodiments, lower temperatures are desired, such as from about 0° C. to about 50° C., or from about 0° C. to about 25° C., but the temperature can also be outside of these ranges.

Characterization of the chemical composition of washed and dried nano-sized pigment particles are performed by NMR spectroscopy and elemental analysis. In a specific embodiment, the composition of the monoazo laked pigment Red 57:1 indicated that the nano-sized particles prepared by the methods described above, particularly when using di[2-ethylhexyl]-3-sulfosuccinate sodium as the sterically bulky stabilizer, retained at least 80% of the sterically bulky stabilizer that was loaded into the process of making the nanoparticles, even after copious washing with deionized water to remove excess salts. Solid state $^1$H- and $^{13}$C-NMR spectroscopic analyses indicated that the steric stabilizer compound was associated non-covalently with the pigment as a calcium salt, and the chemical structure of the pigment adopted the hydrazone tautomer form, as shown in Figure below.

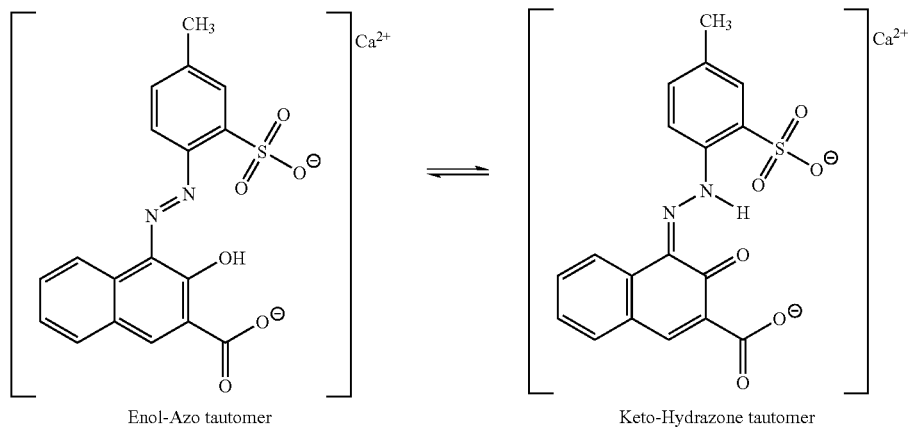

Enol-Azo tautomer    Keto-Hydrazone tautomer

Pigment particles of azo laked pigments such as PR 57:1 that have smaller particle sizes could also be prepared by the above method in the absence of using sterically bulky stabilizers and with the use of surface active agents alone (for example, only rosin-type surface agents), depending on the concentrations and process conditions employed, but the pigment product did not predominantly exhibit nano-sized particles nor did the particles exhibit regular morphologies. In the absence of using the sterically bulky stabilizer compound, the methods described above typically produced rod-like particle aggregates, ranging in average particle diameter from 200-700 nm and with wide particle distribution, and such particles were difficult to disperse into a polymer coating matrix and generally gave poor coloristic properties. In embodiments, the combined use of a suitable sterically bulky stabilizer compound with a minor amount of suitable surface active agent such as derivatives of rosin-type surfactants, using either of the synthesis methods described previously would afford the smallest fine pigment particles having nanometer-scale diameters, more narrow particle size distribution, and low aspect ratio. Various combinations of these compounds, in addition to variations with process parameters such as stoichiometry of reactants, concentration, addition rate, temperature, agitation rate, reaction time, and post-reaction product recovery processes, enables the formation of pigment particles with tunable average particle size ($d_{50}$) from nanoscale sizes (about 1 to about 100 nm) to mesoscale sizes (about 100 to about 500 nm) or larger. The dispersion ability and coloristic properties (L*, a*, b*, chroma, hue angle, light scatter index) of the pigment particles in a thin polymer binder coating were directly correlated to the average pigment particle size, which in turn was impacted by both the structural composition and amount of sterically bulky stabilizer compound (relative to molar amount of pigment) that was employed within the synthesis process.

The advantages of this process include the ability to tune particle size and composition for the intended end-use application of the monoazo pigments, such as toners and inks and coatings, which include phase-change, gel-based and radiation-curable inks, solid and non-polar liquid inks, solvent-based inks and aqueous inks and ink dispersions. For the end-use application in piezoelectric inkjet printing, nanoscale particles are advantageous to ensure reliable inkjet printing and prevent blockage of jets due to pigment particle agglomeration. In addition, nanoscale pigment particles are advantageous for offering enhanced color properties in printed images, since in embodiments the color properties of nanoscale particles of monoazo laked pigment Red 57:1 were tunable with particle size, whereby as average particle size was decreased to nanometer scale, the hue angles were shifted from yellowish-red hues to bluish-red hues by an amount ranging from about 5 to about 35° in the color gamut space.

In embodiments, the nanoscale pigment particles that were obtained for monoazo laked pigments can range in the average particle size, $d_{50}$, or in the average particle diameter, from about 10 nm to about 250 nm, such as from about 25 nm to about 175 nm, or from about 50 nm to about 150 nm, as measured by either dynamic light scattering method or from TEM images. In embodiments, the reaction in a microreactor advantageously provides monoazo laked pigment particles having an average particle size or diameter of from about 10 m to about 150 run, such as about 50 to about 100 nm. In embodiments, the particle size distributions can range such that the geometric standard deviation (denoted as GSD) can range from about 1.1 to about 1.9, or from about 1.2 to about 1.7, as measured by dynamic light scattering method. The shape of the nanoscale pigment particles can be one or more of several morphologies, including rods, platelets, needles, prisms or nearly spherical, and the aspect ratio of the nanoscale pigment particles can range from 1:1 to about 10:1, such as having aspect ratio between 1:1 and 5:1; however the actual metric can lie outside of these ranges.

The color of the nanoscale pigment particles have the same general hue as is found with larger pigment particles. However, in embodiments, is disclosed coloristic properties of thin coatings of the nanoscale pigment particles of red monoazo pigments dispersed in a polymer binder (such as of poly(vinyl butyral-co-vinyl alcohol-co-vinyl acetate)), that exhibited a significant shift to lower hue angle and lower b* values that revealed more bluish magenta hues, and having either no change or a small enhancement of a* value. In embodiments, the hue angles of the coatings dispersed with the nanoscale particles of monoazo laked pigment such as Pigment Red 57:1 measured in the range from about 345° to about 5° on the 2-dimensional b* a* color gamut space, as compared with hue angles ranging from about 0° to about 20° for similarly prepared polymer coatings dispersed with conventional larger sized particles of Pigment Red 57:1. In embodiments is disclosed the coloristic properties (hue angle, a*, b*, and NLSI as measure of specular reflectivity) of nanoscale pigment particles, particularly of monoazo laked red pigment, that are directly correlated and tunable with the average pigment particle size, measured by either Dynamic Light Scattering or electron microscopy imaging techniques, as well as pigment composition with the non-covalently associated stabilizer, the latter which enables the control of particle size during pigment synthesis, and also enables enhanced dispersability within certain polymer binders for coating or other applications.

Additionally, the specular reflectivity of the coatings of the nanoscale monoazo laked red pigment was significantly enhanced from coatings produced with conventional larger sized pigment particles, which is an indicator of having very small particles being well-dispersed within the coating. Specular reflectivity was quantified as the degree of light scattering for the pigmented coating, a property that is dependent on the size and shape distributions of the pigment particles and their relative dispersability within the coating binder. The Normalized Light Scatter Index (NLSI) was quantified by measuring the spectral absorbance of the coating in a region where there is no absorbance from the chromogen of the pigment, but only absorbance due to light scattered from large aggregates and/or agglomerated pigment particles dispersed in the coating binder. The light scattering absorbance data is then normalized to a lambda-max optical density of 1.5, resulting in the NLSI value, in order to directly compare the light scattering indices of several pigmented coatings. The lower is the NLSI value, the smaller is the pigment particle size within the dispersed coating matrix. In embodiments, the NLSI values obtained for the nanoscale monoazo laked red pigments can range from about 0.1 to about 3.0, such as from about 0.1 to about 1.0, as compared to the NLSI values observed with similarly prepared coatings containing larger sized monoazo laked red pigments that range anywhere from about 3.0 to about 75 (a very poorly dispersed coating).

The formed nanoscale pigment particle compositions can be used, for example, as coloring agents in a variety of compositions, such as in liquid (aqueous or non-aqueous) ink vehicles, including inks used in conventional pens, markers, and the like, liquid ink jet ink compositions, solid or phase change ink compositions, and the like. For example, the colored nanoparticles can be formulated into a variety of ink vehicles, including "low energy" solid or gel-type inks with melt temperatures of about 60 to about 130° C., solvent-based liquid inks or radiation-curable such as UV-curable liquid inks comprised of alkyloxylated monomers, and even aqueous inks.

Examples are set forth herein below and are illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Comparative Example 1

Synthesis of Pigment Red 57:1 by a Two-Step Procedure

Step 1: Synthesis of Lithol Rubine Potassium Salt, a Dye Precursor for Pigment Red 57:1

Diazotization: Into a 500 mL round bottom flask equipped with a mechanical stirrer, thermometer, and addition funnel was dissolved 2-amino-5-methylbenzenesulfonic acid (8.82 g, 47.1 mmol) into 0.5M KOH aqueous solution (97.0 mL). A medium brown solution was formed, which was cooled to between 0° C. and 2° C. A 20 wt % aqueous solution of sodium nitrite ($NaNO_2$; 3.28 g, 47.6 mmol dissolved into 25 mL water) was added slowly to the first solution, maintaining the temperature below 3° C., which resulted in a red-brown solution. Concentrated HCl (10 M, 14.15 mL, 141.5 mmol) was then added dropwise while maintaining the internal temperature below 2° C. The mixture formed a light brown suspension. After complete addition of conc. HCl, the suspension was stirred an additional 30 min.

Coupling: In a separate 2-L resin kettle was dissolved 3-hydroxy-2-naphthoic acid (8.86 g, 47.1 mmol) into an aqueous solution of KOH (8.72 g, 155.4 mmol) in water (95 mL). Additional water was added (250 mL), and the light-brown solution was then cooled to about 15° C. while stirring vigorously. The cold suspension of the diazonium salt solution from Step A was then transferred slowly into the coupling solution of Step B, while mixing vigorously. The color changed from dark red solution, to ultimately a yellowish-red (orange) slurry of precipitated colorant. The mixture was stirred for another 2 hours at room temp, then vacuum-filtered and diluted with water (500 mL) to provide an orange aqueous slurry of Lithol Rubine Dye Potassium salt, with approximate solids content of about 1.6%-wt.

Step 2: Laking Process Step.

Into a 500 mL round bottom flask equipped with mechanical stirrer and condenser was charged 125.8 g of aqueous slurry of Lithol Rubine Dye Potassium salt from Example 1 (1.6% wt solids content, 2.0 grams of colorant, 4.33 mmol). The pH of the slurry was adjusted to above 9.0 by the addition of 0.5 M KOH solution. A solution of calcium chloride dehydrate (0.5 M solution in water, 13 mL) was added dropwise to the slurry while stirring vigorously. A red precipitate formed immediately, and after addition was completed, the slurry was stirred for another 2 hours. The slurry was then heated to about 75° C. for 20 min, then cooled to room temp. The slurry was vacuum-filtered using a 0.8 µm Nylon membrane cloth, then reslurried twice with water (150 mL portions). The pH and conductivity of the filtrates after each filtration were measured and recorded, with the second (final) wash filtrate having pH of 6.17 and conductivity of about 13.5 µS/cm. The red pigment filtercake was reslurried into about 200 mL of water and freeze-dried, to afford a red colored powder (1.92 grams).

Comparative Example 2

Preparation of NanoPigment Red 57:1 Using Steric Stabilizer, in a Batch Process

Laking step in batch process: Into a 500 mL round bottom flask equipped with mechanical stirrer and condenser was charged 125.8 g of aqueous slurry of Lithol Rubine Potassium salt from Comparative Example 1 (1.6% wt solids content, 2.0 grams of colorant, 4.33 mmol). The pH of the slurry was adjusted to above 9.0 by the addition of 0.5 M KOH solution. An aqueous solution of a rosin soap (5 wt % Dresinate X, 4.0 mL) was added while stirring, followed by a prepared solution containing sodium dioctyl sulfosuccinate (0.96 g, 2.17 mmol) dissolved in 90:10 water/THF mixture (100 mL), added while stirring the slurry vigorously. An aqueous solution of calcium chloride dihydrate (0.5 M solution, 13 mL, 6.50 mmol) was added dropwise to the slurry while stirring vigorously. A red precipitate formed immediately, and after addition was completed, the slurry was stirred for an additional 1.5 hours. The red slurry was then heated to about 75° C. for 20 min, then cooled to room temp. The slurry was vacuum-filtered through a 0.8 μm Nylon membrane cloth, then reslurried twice with water. The pH and conductivity of the filtrates after each filtration were measured and recorded, with the second (final) wash filtrate having pH of 7.4 and conductivity of about 110 μS/cm. The red pigment filtercake was reslurried into water (200 mL) and freeze-dried to afford a brown-red colored powder (2.65 grams).

Example 1

Preparation of NanoPigment Red 57:1 Using Steric Stabilizer in a Microreactor Process (Microreactor Used is Cytos Lab System Purchased from Micro-Reactor Systems Provider, Inc,) with the Following Configuration: Microreactor Unit+no Residence Time Units, Operating at 25° C. and 20 mL/min Preparation of feed stream 1: In an Erlenmeyer flask (250 mL) Lithol Rubine Potassium Salt dye precursor solids (1.0 g solids) were diluted to 1.0 wt % slurry (100 g). To this slurry was added about 2 mL of a 5 wt % solution of Dresinate-X in 80:20 $H_2O$/THF mixture and 10.8 mL from 0.1M solution of sodium dioctyl sulfosuccinate dissolved in 90:10 $H_2O$/THF). The pH of this solution was then adjusted to above 10 with 1.0M KOH solution, which gave a dark red, homogeneous solution.

Preparation of feed stream 2: In an Erlenmeyer flask was prepared a 0.02M aqueous solution of $CaCl_2$.

Laking in Microreactor: Feed stream 1 containing sodium dioctyl sulfosuccinate, Dresinate-X, potassium hydroxide solution and Lithol Rubine dye precursor and Feed steam 2 containing 0.02 M $CaCl_2$ solution were fed at flowrates of 10 mL/min respectively using Waters HPLC pumps into the microreactor preheated at 25° C. (microreactor plate+no residence time units, residence time of 5 seconds, Reynolds number of 520 indicating laminar flow). Once the process reached a steady state, the product stream was collected on a 0.8 μm membrane filter and filtered continuously.

Sample Preparation for TEM analysis: Approximately 2 mL of n-BuOH was added to re-disperse the pigment filtercake from the membrane. All samples were sonicated for about 5 minutes to promote dispersion. A representative droplet from each sample was pipetted onto a carbon-coated copper grid and allowed to dry before being examined. The two samples were examined using a Philips (now FEI) CM20 transmission electron microscope operated at 80 KV.

Example 2

Preparation of NanoPigment Red 57:1 Using Steric Stabilizer in a Microreactor Process (Microreactor Used is Cytos Lab System Purchased from Micro-Reactor Systems Provider, Inc,) with the Following Configuration: Microreactor Unit+no Residence Time Units, Operating at 0° C. and 20 mL/min Preparations of feed streams 1 and 2, and work-up are as described in Example 1.

Laking in Microreactor: Feed stream 1 containing sodium dioctyl sulfosuccinate, Dresinate-X, potassium hydroxide solution and Lithol Rubine dye precursor and Feed steam 2 containing 0.02 M $CaCl_2$ solution were fed at flowrates of 10 mL/min respectively using Waters HPLC pumps into the microreactor cooled to 0° C. (microreactor plate+no residence time units, residence time of 5 seconds, Reynolds number of 520 indicating laminar flow). Once the process reached a steady state, the product stream was collected on a 0.8 μm membrane filter and filtered continuously.

Example 3

Preparation of NanoPigment Red 57:1 using Steric Stabilizer in a Microreactor Process (Microreactor Used is Cytos Lab System Purchased from Micro-Reactor Systems Provider, Inc,) with the Following Configuration: Microreactor Unit+Two Residence Time Units, Operating at 25° C. and 15 mL/min Preparation of feed stream 1: In an Erlenmeyer flask (250 mL) Lithol Rubine Potassium Salt dye precursor solids (1.5 g solids, from Example 1) were diluted to 1.0 wt % slurry (150.3 g). To this slurry was added about 3 mL of a 5 wt % solution of Dresinate-X in 80:20 $H_2O$/THF mixture and 16.3 mL from 0.1M solution of sodium dioctyl sulfosuccinate dissolved in 90:10 $H_2O$/THF). The pH of this solution was then adjusted to above 10 with 1.0M KOH solution which gave a dark red, homogeneous solution.

Preparation of feed stream 2: In an Erlenmeyer flask was prepared an aqueous solution of 0.02 M $CaCl_2$.

Laking in Microreactor: Feed stream 1 containing sodium dioctyl sulfosuccinate, Dresinate-X, potassium hydroxide solution and Lithol Rubine dye precursor and Feed steam 2 containing 0.02 M $CaCl_2$ solution were fed at flowrates of 7.5 mL/min respectively using Waters HPLC pumps into the microreactor set at 25° C. (microreactor plate+two residence time units, residence time of 2.1 minutes, Reynolds number of 390 indicating laminar flow). Once the process reached a steady state, the product stream was collected on a 0.8 μm membrane filter and filtered continuously.

Work-up for TEM analysis is as described in Example 2.

Example 4

Preparation of NanoPigment Red 57:1 Using Steric Stabilizer in a Microreactor Process (Microreactor Used is Cytos Lab System Purchased from Micro-Reactor Systems Provider, Inc,) with the Following Configuration: Microreactor Unit+Two Residence Time Units, Operating at 0° C. and 20 mL/min Preparation of feed stream 1: In an Erlenmeyer flask (250 mL) Lithol Rubine Potassium Salt dye precursor solids (1.4 g solids, from Comparative Example 1) were diluted to 1.0 wt % slurry (140 g). To this slurry was added about 2.8 mL of a 5 wt % solution of Dresinate-X in 80:20 $H_2O$/THF mixture and 16.3 mL from 0.1M solution of sodium dioctyl sulfosuccinate dissolved in 90:10 $H_2O$/THF). The pH of this solution was then adjusted to above 10 with 1.0M KOH solution which gave a dark red, homogeneous solution.

Preparation of feed stream 2: In an Erlenmeyer flask was prepared an aqueous solution of 0.02 M $CaCl_2$.

Laking in Microreactor: Feed stream 1 containing sodium dioctyl sulfosuccinate, Dresinate-X, potassium hydroxide solution and Lithol Rubine dye precursor and Feed steam 2 containing 0.02 M $CaCl_2$ solution were fed at flowrates of 10 mL/min respectively using Waters HPLC pumps into the microreactor cooled to 0° C. (microreactor plate+two residence time units, residence time of 1.6 minutes, Reynolds number of 520 indicating laminar flow). Once the process reached a steady state, the product stream was collected in a vessel under agitation. Aliquots were obtained from the product stream and filtered on a 0.8 µm membrane continuously for TEM analysis.

Work-up for TEM analysis is as described in Example 2.

Example 5

Preparation of NanoPigment Red 57:1 Using Steric Stabilizer in a Micromixer Process with the Following Configuration: Caterpillar Mixer Model CPMM-R300 (Purchased from Institut für Mikrotechnik Mainz GmbH) with Internal Volume of 10 µl Operating at Room Temperature and 15 mL/min.

Preparation of feed stream 1: In an Erlenmeyer flask (250 mL) Lithol Rubine Potassium Salt dye precursor solids (0.42 g solids, from Comparative Example 1) were diluted to 1.0 wt % slurry (42.0 g). To this slurry was added about 0.85 mL of a 5 wt % solution of Dresinate-X in 80:20 $H_2O$/THF mixture and 4.55 mL from 0.1M solution of sodium dioctyl sulfosuccinate dissolved in 90:10 $H_2O$/THF). The pH of this solution was then adjusted to above 10 with 1.0M KOH solution which gave a dark red, homogeneous solution.

Preparation of feed stream 2: In an Erlenmeyer flask was prepared an aqueous solution of 0.02 M $CaCl_2$.

Laking in Micromixer: Feed stream 1 containing sodium dioctyl sulfosuccinate, Dresinate-X, potassium hydroxide solution and Lithol Rubine dye precursor and Feed steam 2 containing 0.02 M $CaCl_2$ solution were fed at flowrates of 7.5 mL/min respectively using Waters HPLC pumps into the micromixer at room temperature (residence time of 40 microseconds, Reynolds number of 840 indicating laminar flow). Once the process reached a steady state, the product stream was collected on a 0.8 µm membrane filter and filtered continuously.

Work-up for TEM analysis is as described in Example 2.

Example 6

TEM Characterization of NanoPigments

Sample Preparation for TEM analysis: Approximately 2 mL of n-BuOH was added to re-disperse the pigment filtercake from the membrane. All samples were sonicated for about 5 minutes to promote dispersion. A representative droplet from each sample was pipetted onto a carbon-coated copper grid and allowed to dry before being examined. The two samples were examined using a Philips (now FEI) CM20 transmission electron microscope operated at 80 KV.

Figure 2A:
FIGS. 2a-2b show TEM images of pigment particles prepared according to the Examples and Comparative Examples.
Figure 2B:

FIG. 2a is a lab control sample of Pigment Red 57:1, (prepared as in Comparative Example 1 above and which has larger-sized particles). FIG. 2b is an image of nanopigment particles of PR 57:1, prepared by a microreactor process as in Example 4, with 1 microreactor unit and two residence time units at a flow rate of 20 mL/min and at temperature of 0° C.

TEM particle size measurements show that the pigments produced in a batch two step process (Comparative Example 1) are rod like particles with large aspect (length: width) ratios. Particle lengths range from about 150 nm to >800 nm with an average particle size in the range of 300-500 nm; particle widths range from approximately 40 nm to 100 nm resulting in average aspect ratios of approximately 7:1, length to width. Pigments produced by the microreactor using Surfactant Stabalizers (Example 4) are of smaller size and range from approximately 30 nm to 200 nm in length with an average particle size in the range of 50 nm to 100 nm. Particles greater than 100 nm are multi-faceted indicating that they are aggregates of nanoscale particles. The average width of the particles is in the range of 20 to 50 nm with most particles measuring approximately 30 nm. The aspect ratio of particles in Example 4 is therefore 3:1, length to width.

Example 7a

Preparation of Liquid Dispersions and Coatings

Into a 30 mL amber bottle was added 0.22 g of Permanent Rubine P-L7B 01, available from Clariant Corporation, 0.094 g polyvinylbutyral terpolymer (B30HH obtained from Hoescht), 7.13 g n-butyl acetate (glass-distilled grade, obtained from Caledon Laboratories) and 70.0 g of ⅛" stainless steel shot (Grade 25 440C obtained from Hoover Precision Products). The bottle was transferred to a jar mill and allowed to gently mill for 4 days at about 100 RPM. Two draw-down coatings were obtained from the resultant dispersion using an 8-path gap on clear Mylar® film such that the wet thicknesses for each coating comprised of PR 57:1 pigment sample were 0.5 and 1 mil. The air-dried coatings on clear Mylar® film were then dried in a horizontal forced-air oven at 100° C. for 20 minutes.

Example 7b

Preparation of Liquid Dispersion and Coatings

A dispersion and subsequent coatings thereof were prepared in the same manner as in example 7a except that the pigment used was from Comparative Example 1.

Example 7c

Preparation of Liquid Dispersion and Coatings

A dispersion and subsequent coatings thereof were prepared in the same manner as in example 7a except that the pigment used was from Comparative Example 2.

Example 7d

Preparation of Liquid Dispersion and Coatings

A dispersion and subsequent coatings thereof were prepared in the same manner as in example 7a except that the pigment used was from Example 3.

Example 7e

Preparation of Liquid Dispersion and Coatings

A dispersion and subsequent coatings thereof were prepared in the same manner as in example 7a except that the pigment used was from Example 4.

Example 8

Evaluation of Coatings prepared from Liquid Pigment Dispersions

The coloristic properties of the Mylar® coatings prepared in Examples 7a, 7b, 7c, 7d and 7e were determined using an X-RITE 938 spectrodensitometer, $D_{50}$, 2° measurement mode. L* a* b* and optical density (O.D.) values were obtained for each of the samples, and the L* a* b* were normalized to an optical density of 1.5, and then used to calculate the hue angle and chroma (C*), as listed in Table 8. The CIE L*a*b* Delta E metric (ΔE*) was used to compare the differences in L* a* b* of coatings made in Examples 7a, 7b, 7d and 7e against the reference L* a* b* of coatings made in Example 7c. The coloristic properties of the pigments from Examples 3 and 4 made by a microreactor process were very similar to those measured for the nanopigment from Comparative Example 2 made by a batch process. ΔE* was small with visually imperceptible differences among the samples made in Examples 3 and 4 relative to Comparative Example 2. In summary, the nanopigment PR 57:1 samples prepared by a microreactor had excellent dispersability and coatability attributes in great similarity to the comparative nanopigment sample prepared by a two step batch process. In addition the microreactor samples offer, in contrast to commercially available pigments (7a) and pigments produced without steric stabilizers (7b), coatings with bluish hue angle shifts less than about 0 degrees, especially less than about 350 degrees.

TABLE 8

Coloristic properties normalized to O.D. = 1.5

| Metric | Example 7a | Example 7b | Example 7c | Example 7d | Example 7e |
|---|---|---|---|---|---|
| L* | 47.86 | 44.78 | 50.76 | 51.56 | 52.25 |
| a* | 71.06 | 71.52 | 77.33 | 78.14 | 78.10 |
| b* | 8.73 | 34.78 | −15.62 | −14.83 | −14.53 |
| Hue Angle (°) | 7.0 | 25.9 | 348.6 | 349.3 | 349.5 |
| C* | 71.6 | 79.5 | 78.6 | 79.8 | 79.4 |
| ΔE* | 25.3 | 51.1 | reference | 1.4 | 2.0 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A process for preparing nanoscale azo pigment particles, comprising:
   providing an organic pigment precursor that contains at least one functional moiety,
   providing a sterically bulky stabilizer compound that contains at least one functional group, and
   carrying out a chemical reaction to form a pigment composition in a microreactor or micromixer, whereby the functional moiety found on the pigment precursor is incorporated within the pigment and non-covalently associated with the functional group of the stabilizer, so as to allow formation of nanoscale-sized pigment particles.

2. The process of claim 1, wherein the azo pigment particles are selected from the group consisting of monoazo pigment particles, monoazo laked pigment particles, disazo pigment particles, and disazo laked pigment particles.

3. The process of claim 1, further comprising:
   forming a first solution or suspension comprising the organic pigment precursor; and
   forming a second solution or suspension comprising a metal salt;
   wherein said carrying out a chemical reaction comprises feeding the first solution or suspension and the second solution or suspension into the microreactor or micromixer.

4. The process of claim 3, wherein the sterically bulky stabilizer compound is fed to the microreactor or micromixer as part of the first solution or suspension, or as a separate feed stream.

5. The process of claim 1, further comprising:
   forming a first solution or suspension comprising the organic pigment precursor and substantially no metal cation salt; and
   forming a second solution or suspension comprising a metal salt;
   wherein said carrying out a chemical reaction comprises:
      feeding the first solution or suspension and the second solution or suspension into the microreactor or micromixer;
      combining the first solution or suspension and the second solution or suspension to form a water-soluble dye;
      treating the water-soluble dye with an acid or a base to form a homogeneous solution or a fine suspension; and
      reacting the water-soluble dye with a solution of a metal cation salt to precipitate the nanoscale-sized pigment particles.

6. The process of claim 1, wherein reactants are fed to the microreactor or micromixer at flowrates of between about 0.1 and about 100 mL/min each.

7. The process of claim 1, wherein a Reynold's number of fluid flowing through the microreactor or micromixer is from about 10 to about 10,000.

8. The process of claim 1, wherein the microreactor or micromixer is maintained at a temperature of from about 0° C. and about 25° C. during the chemical reaction.

9. The process of claim 1, wherein flow of the organic pigment precursor and the sterically bulky stabilizer compound in the microreactor or micromixer is under laminar flow conditions.

10. The process of claim 1, wherein flow of the organic pigment precursor and the sterically bulky stabilizer compound in the microreactor or micromixer is under turbulent flow conditions.

11. The process of claim 1, wherein a residence time in the microreactor or micromixer is from about 0.04 seconds to about 1 hour.

12. The process of claim 1, wherein the microreactor or micromixer comprises one or more residence time plates or units.

13. The process of claim 1, wherein the nanoscale-sized pigment particles have an average particle diameter as derived from transmission electron microscopy imaging, of less than about 150 nm.

14. The process of claim 1, wherein the at least one functional moiety of the organic pigment precursor is selected from the group consisting of sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary and secondary amides, primary and secondary amines, hydroxyl, ketone, aldehyde, oxime, hydroxylamino, enamines, porphyrins, (phthalo)cyanines, urethane, carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, indenones, and mixtures thereof.

15. The process of claim 1, wherein the nanoscale azo pigment particles are organic monoazo laked pigments comprising a diazonium component linked to a coupling component through an azo or hydrazone group, with a counterion.

16. The process of claim 15, wherein a precursor to the diazonium component of the monoazo laked pigment is a compound of Formula (2):

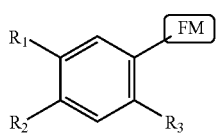

Formula (2)

where $R_1$, $R_2$, and $R_3$ independently represent H, a straight or branched alkyl group of from about 1 to about 10 carbon atoms, halogen, $NH_2$, $NO_2$, $CO_2H$, or $CH_2CH_3$; and FM represents $SO_3H$, —C(=O)—NH-Aryl-$SO_3^-$ (where the aryl group can be unsubstituted or substituted with either halogens or alkyl groups having from about 1 to about 10 carbons), $CO_2H$, halogen, $NH_2$, or —C(=O)—$NH_2$, or is a compound of Formula (3):

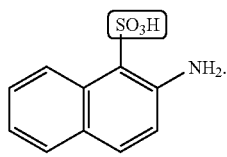

Formula (3)

17. The process of claim 16, wherein the precursor to the diazonium component is selected from the group consisting of the following compounds of Formula (2) wherein:

FM is $SO_3H$, $R_1$ is $CH_3$, $R_2$ is H, and $R_3$ is $NH_2$,
FM is $SO_3H$, $R_1$ is $CH_3$, $R_2$ is Cl, and $R_3$ is $NH_2$,
FM is $SO_3H$, $R_1$ is Cl, $R_2$ is $CH_3$, and $R_3$ is $NH_2$,
FM is $SO_3H$, $R_1$ is Cl, $R_2$ is $CO_2H$, and $R_3$ is $NH_2$,
FM is $SO_3H$, $R_1$ is Cl, $R_2$ is $CH_2CH_3$, and $R_3$ is $NH_2$,
FM is $SO_3H$, $R_1$ is Cl, $R_2$ is Cl, and $R_3$ is $NH_2$,
FM is $SO_3H$, $R_1$ is H, $R_2$ is $NH_2$, and $R_3$ is H,
FM is $SO_3H$, $R_1$ is H, $R_2$ is $NH_2$, and $R_3$ is $CH_3$,
FM is $SO_3H$, $R_1$ is $NH_2$, $R_2$ is H, and $R_3$ is Cl,
FM is $SO_3H$, $R_1$ is H, $R_2$ is H, and $R_3$ is $NH_2$,
FM is $SO_3H$, $R_1$ is H, $R_2$ is $NH_2$, and $R_3$ is H,
FM is $SO_3H$, $R_1$ is $NO_2$, $R_2$ is $NH_2$, and $R_3$ is H,
FM is —C(=O)—NH-Phenyl-$SO_3^-$, $R_1$ is $NH_2$, $R_2$ is $CH_3$, and $R_3$ is H,
FM is $CO_2H$, $R_1$ is H, $R_2$ is H, and $R_3$ is $NH_2$,
FM is Cl, $R_1$ is H, $R_2$ is H, and $R_3$ is $NH_2$,
FM is $NH_2$, $R_1$ is $CH_3$, $R_2$ is H, and $R_3$ is H,
FM is $NH_2$, $R_1$ is H, $R_2$ is $CH_3$, and $R_3$ is H,
FM is —C(=O)$NH_2$, $R_1$ is $NH_2$, $R_2$ is $CH_3$, and $R_3$ is H,
FM is —C(=O)$NH_2$, $R_1$ is H, $R_2$ is $NH_2$, and $R_3$ is H,
FM is $NH_2$, $R_1$ is H, $R_2$ is H, and $R_3$ is H,
FM is $SO_2NHCH_3$, $R_1$ is $OCH_3$, $R_2$ is $NH_2$, and $R_3$ is $CH_3$, and
FM is $CO_2CH_3$, $R_1$ is H, $R_2$ is H, and $R_3$ is $NH_2$.

18. The process of claim 15, wherein a precursor to the coupling component of the monoazo laked pigment is selected from the group consisting of β-naphthol and derivatives thereof, naphthalene sulfonic acid derivatives, pyrazolone derivatives, acetoacetic arylide derivatives, and benzimidazolone derivatives.

19. The process of claim 15, wherein a precursor to the coupling component is selected from the group consisting of compounds of Formulas (4)-(8), wherein * denotes a point of coupling or attachment to the azo or hydrazone group:

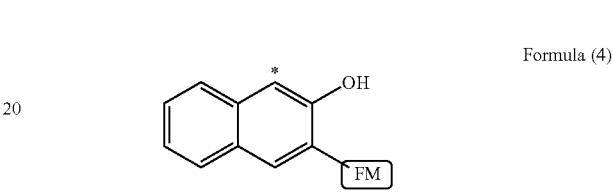

Formula (4)

where FM represents H, $CO_2H$, $SO_3H$, —C(=O)—NH-Aryl-$SO_3^-$ where the aryl group can be unsubstituted or substituted with either halogens, or alkyl groups having from about 1 to about 10 carbons, $CO_2H$, halogen, $NH_2$, —C(=O)—$NH_2$, substituted benzamides of the formula:

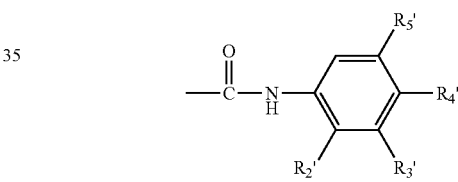

wherein groups $R_2'$ $R_3'$, $R_4'$ and $R_5'$ can independently be H, alkyl groups having from about 1 to 10 carbons, alkoxyl groups, hydroxyl or halogens, or $NO_2$; or benzimidazolone amides of the formula:

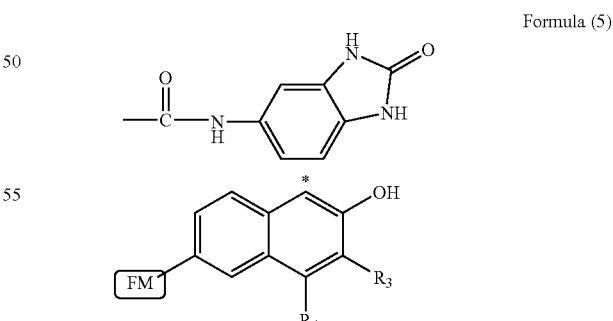

Formula (5)

where FM represents $SO_3H$, $CO_2H$, —C(=O)—NH-Aryl-$SO_3^-$ where the aryl group can be unsubstituted or substituted with either halogens, or alkyl groups having from about 1 to about 10 carbons, $CO_2H$, halogens, $NH_2$, —C(=O)—$NH_2$ groups $R_3$ and $R_4$ independently represent H, $SO_3H$;

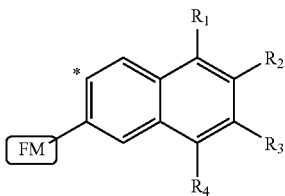

Formula (6)

where FM represents SO₃H, CO₂H, —C(=O)—NH-Aryl-SO₃⁻ where the aryl group can be unsubstituted or substituted with either halogens, or alkyl groups having from about 1 to about 10 carbons, CO₂H, halogens, NH₂, —C(=O)—NH₂; $R_1$, $R_2$, $R_3$ and $R_4$ independently represent H, SO₃H, —C(=O)—NH-Phenyl,

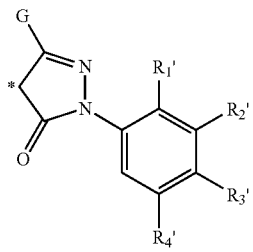

Formula (7)

where G represents CO₂H, straight or branched alkyl having from 1 to about 10 carbons atoms; and $R_1'$, $R_2'$, $R_3'$ and $R_4'$ independently represent H, halogens, SO₃H, nitro NO₂ or alkoxyl groups;

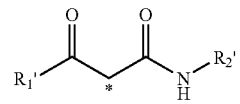

Formula (8)

where $R_1'$ represents a straight or branched alkyl group having from 1 to about 10 carbon atoms, $R_2'$ represents

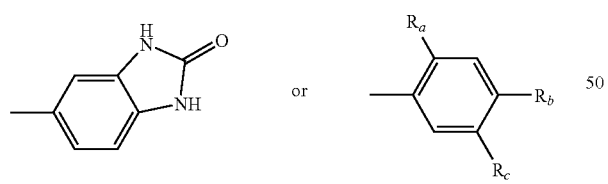

where each of $R_a$, $R_b$, and $R_c$ independently represents H, a straight or branched alkyl group having from 1 to about 10 carbon atoms, OCH₃, or halogens.

20. The process of claim 15, wherein the counterion is selected from the group consisting of metals, non-metals, and cations or anions based on either carbon, nitrogen or phosphorus.

21. The process of claim 1, wherein the at least one functional group of the sterically bulky stabilizer is selected from the group consisting of sulfonate/sulfonic acid, (thio)carboxylate/(thio)carboxylic acid, phosphonate/phosphonic acid, ammonium and substituted ammonium salts, phosphonium and substituted phosphonium salts, substituted carbonium salts, substituted arylium salts, alkyl/aryl (thio)carboxylate esters, thiol esters, primary and secondary amides, primary and secondary amines, hydroxyl, ketone, aldehyde, oxime, hydroxylamino, enamines, porphyrins, (phthalo)cyanines, urethane, carbamate, substituted ureas, guanidines and guanidinium salts, pyridine and pyridinium salts, imidazolium and (benz)imidazolium salts, (benz)imidazolones, pyrrolo, pyrimidine and pyrimidinium salts, pyridinone, piperidine and piperidinium salts, piperazine and piperazinium salts, triazolo, tetraazolo, oxazole, oxazolines and oxazolinium salts, indoles, indenones, and mixtures thereof.

22. The process of claim 1, wherein the sterically bulky stabilizer comprises at least one aliphatic hydrocarbon moiety.

23. The process of claim 1, wherein the sterically bulky stabilizer is selected from the group consisting of the following compounds:

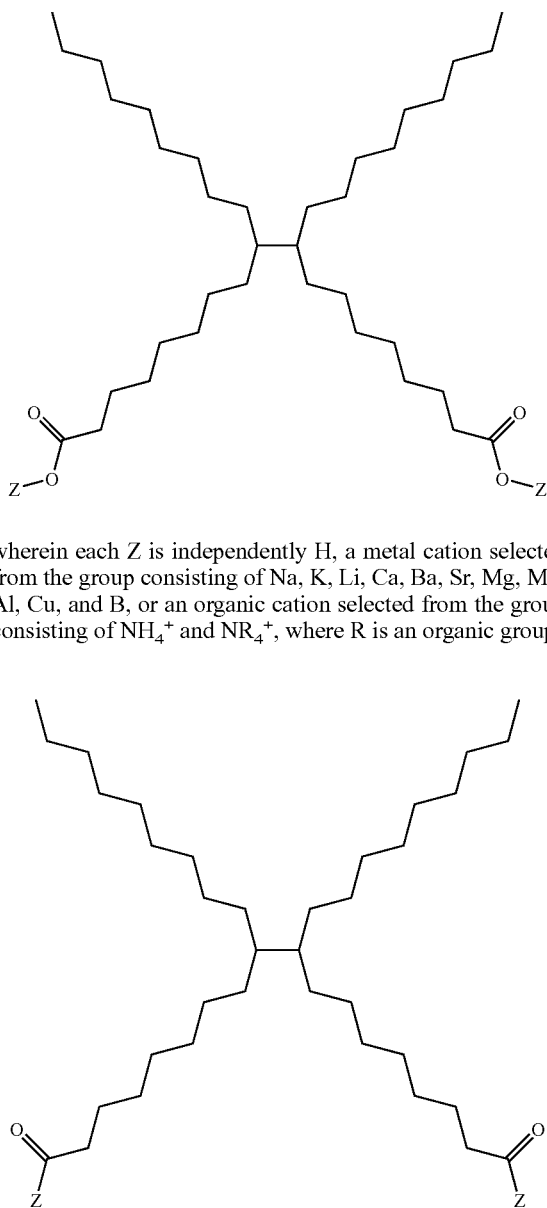

wherein each Z is independently H, a metal cation selected from the group consisting of Na, K, Li, Ca, Ba, Sr, Mg, Mn, Al, Cu, and B, or an organic cation selected from the group consisting of NH₄⁺ and NR₄⁺, where R is an organic group, wherein each Z is independently H, OH, NH₂, NHR', or OR', where R' is a $C_1$-$C_6$ alkyl group or $C_6$-$C_{14}$ aryl group,

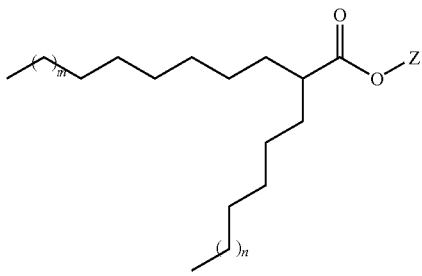

wherein each Z is independently H, a metal cation selected from the group consisting of Na, K, Li, Ca, Ba, Sr, Mg, Mn, Al, Cu, and B, or an organic cation selected from the group consisting of $NH_4^+$, $NR_4^+$, and $PR_4^+$, where R is an organic group, and m and n are integers representing repeating methylene units where m+n>1,

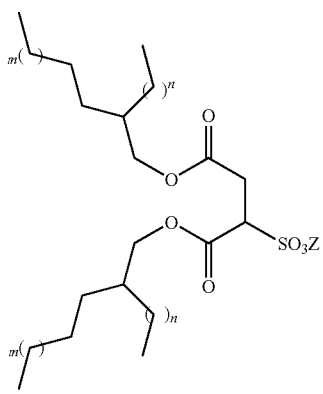

wherein each Z is independently H, a metal cation selected from the group consisting of Na, K, Li, Ca, Ba, Sr, Mg, Mn, Al, Cu, and B, or an organic cation selected from the group consisting of $NH_4^+$, $NR_4^+$, and $PR_4^+$, where R is an organic group, and m and n are integers representing repeating methylene units where m+n>1 per branch,

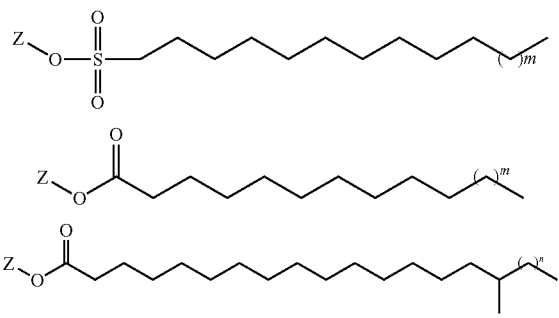

wherein each Z is independently H, a metal cation selected from the group consisting of Na, K, Li, Ca, Ba, Sr, Mg, Mn, Al, Cu, and B, or an organic cation selected from the group consisting of $NH_4^+$, $NR_4^+$, and $PR_4^+$, where R is an organic group, m is an integer representing repeating methylene units where m≧1 and n is 0 or 1

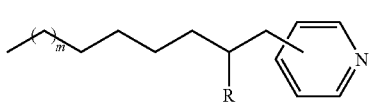

wherein m is an integer from 0 to about 12; R is H, CH₃, or $(CH_2)_nCH_3$ where n is an integer of from 0 to about 5,

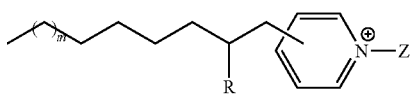

wherein m is an integer from 0 to about 12; R is H, CH₃, or $(CH_2)_nCH_3$ where n is an integer of from 0 to about 5; Z is H or CH₃; X is Cl, Br, I, $SO_4^{2-}$, $MeSO_4^-$, $O_3S$-p-$(C_6H_4)CH_3$,

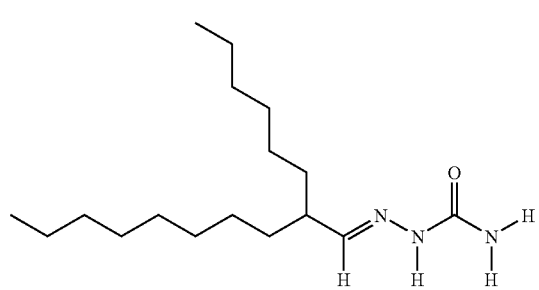

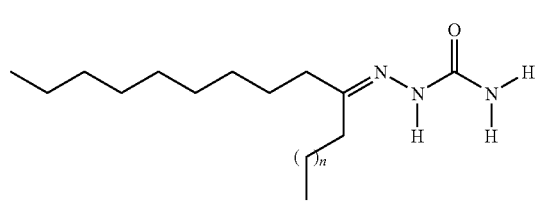

wherein n is an integer from 0 to about 10,

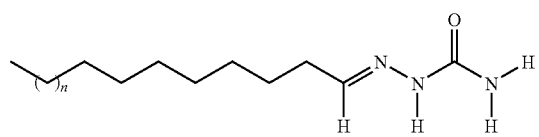

wherein n is an integer from 0 to about 25,

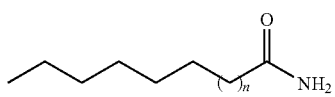

wherein n is an integer from 1 to about 30,

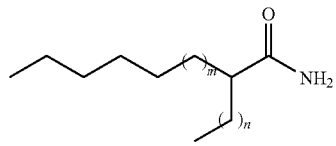

wherein m is an integer from 1 to about 30 and n is an integer from 1 to about 11,

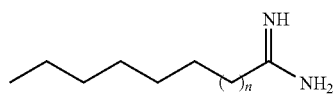

wherein n is an integer from 1 to about 30,

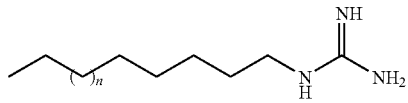

wherein n is an integer from 1 to about 14, and

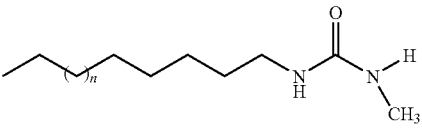

wherein n is an integer from 1 to about 30.

24. The process of claim 1, further comprising adding a surfactant selected from the group consisting of rosin compounds; acrylic-based polymers; styrene-based copolymers; copolymers of α-olefins; copolymers of vinyl pyridine, vinyl imidazole, and vinyl pyrrolidinone; polyester copolymers; polyamide copolymers; and copolymers of acetals and acetates.

25. The process of claim 1, wherein the non-covalent association between the organic pigment and the sterically bulky stabilizer compound is at least one of van der Waals' forces, ionic bonding, coordination bonding, hydrogen bonding, and aromatic pi-stacking bonding.

26. The process of claim 1, wherein presence of the associated stabilizer limits an extent of particle growth and aggregation, to afford nanoscale-sized particles of azo pigments without clogging the microreactor or micromixer.

* * * * *